United States Patent
Takayama et al.

[19]

[11] Patent Number: 5,850,551
[45] Date of Patent: *Dec. 15, 1998

[54] COMPILER AND PROCESSOR FOR PROCESSING LOOPS AT HIGH SPEED

[75] Inventors: Shuichi Takayama, Takarazuka; Nobuo Higaki, Osaka; Nobuki Tominaga, Kyoto; Shinya Miyaji, Nara, all of Japan

[73] Assignee: Matsushita Electric Industrial Co., Ltd., Kadoma, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 588,051

[22] Filed: Jan. 22, 1996

[30] Foreign Application Priority Data

May 12, 1995 [JP] Japan .................................. 7-114520

[51] Int. Cl.$^6$ .................................................... G06F 9/45
[52] U.S. Cl. ........................... 395/708; 395/705; 395/704
[58] Field of Search ................................... 395/584, 704, 395/705, 703, 702, 708, 709

[56] References Cited

U.S. PATENT DOCUMENTS

| | | | |
|---|---|---|---|
| 4,463,422 | 7/1984 | Storer et al. | |
| 4,725,947 | 2/1988 | Shonai et al. | 395/584 |
| 4,807,126 | 2/1989 | Gotou et al. | 395/704 |
| 5,450,585 | 9/1995 | Johnson | 395/704 |
| 5,506,976 | 4/1996 | Jagger | 395/584 |

FOREIGN PATENT DOCUMENTS

| | | | |
|---|---|---|---|
| 270310 | 11/1987 | European Pat. Off. | |
| 0270310 | 8/1988 | European Pat. Off. | G06F 9/38 |
| 487082 | 11/1991 | European Pat. Off. | |

OTHER PUBLICATIONS

"The Horizon Supercomputing System: Architecture & Software", by J.T.Kuehn, Supercomputing '88, Orlando, Florida, Nov. 14–18 Nov. 1988 ISBN.

"Compiling for the Horizon Instruction Set", by J.M.Draper, CONPAR 88, Manchester, UK 12–16 Sep. 1988.

"Reducing the Cost of Branches by Using Registers", by J.W.Davidson et al., Annual Int'l Symposium on Computer Architecture, Seattle, WA May 28–31, 1990.

John M. Feldman, Charles T. Retter, Computer Architecture A Designer's Text Based on Generic Risc, McGraw–Hill, Inc., Jan. 1994.

Primary Examiner—Lucien U. Toplu
Assistant Examiner—Peter Stecher
Attorney, Agent, or Firm—Price, Gess & Ubell

[57] ABSTRACT

A compiler comprises a loop detecting unit for extracting information of loops, and a high-speed loop applying unit generating a first loop exclusive instruction, placing the instruction immediately before the entry of a loop, generating second loop exclusive instructions, and placing the instruction at each place to branch to the entry of the loop. A processor comprises: a pipeline comprising: an instruction fetching unit, an instruction decoding unit, and an executing unit; a branch target storage unit; a branch target registering unit for, after the instruction decoding unit has decoded a first loop exclusive instruction, registering branch target information of an instruction succeeding to the first loop exclusive instruction in the branch target registering unit; and a branch executing unit for, after the decoding unit has decoded a second loop exclusive instruction, judging whether to execute a loop, if judges to execute, reading the branch target information registered in the branch target storage unit, and controlling the pipeline so that the program executes the loop using the read branch target information.

16 Claims, 18 Drawing Sheets

Fig. 1

```
            mov 0, i
        L:
            add a, b, c
            mul a, b, d
            add i, 1, i
            cmp i, 3
            bcc L
```

Fig. 2

```
    int a,b,c,d,i ;
    main ()
    {
        for (i=0 ; <3 ; i++)
        {
            c=a+b ;
            d=a*b ;
        }
    }
```

Fig. 7

```
        mov 0, i
        set
L:
        add a, b, c
        mul a, b, d
        add i, 1, i
        cmp i, 3
        lcc L
        clr
```

COMPILER AND PROCESSOR FOR PROCESSING LOOPS AT HIGH SPEED

BACKGROUND OF THE INVENTION (1). Field of the Invention

This invention relates to a compiler for compiling source programs into machine-language instruction sequences and to a processor for executing the machine-language instruction sequences using a pipeline processing, and especially relates to a compiler and a processor for executing loops at high speed.

(2). Description of the Prior Art

A pipeline processing is known as one of fundamental techniques for achieving high-speed processing by a Central Processing Unit (CPU: hereinafter processor). In the pipeline processing, a process dealing with instructions is divided into smaller units, or pipeline stages, then each pipeline stage is processed at the same time to improve the processing speed. However, the technique is not effective in processing loops because stalls occur when branch instructions are processed. Due to the stalls, the operational performance of the pipeline processing does not reach the ideal performance. This phenomenon is called a branch hazard.

Now, the branch hazard is explained with reference to FIG. 1 and FIG. 2.

FIG. 1 shows a source program in which an addition and a multiplication between two integers are repeated three times each.

FIG. 2 shows a machine-language instruction sequence obtained by compiling the source program of FIG. 1. The operands and instructions used in the instruction sequence are as follows:

a, b, c, d, i: Registers assigned to integer variables.

mov 0, i: Transfer 0 into i.

L: Label.

add a,b,c: Transfer sum of a and b into c.

mul a,b,d: Transfer result of multiplication a*b into d.

add i,1,i: Add 1 to i. cmp i,3: Compare i with 3.

bcc L: Branch to L if comparison result of "cmp i,3" is i <3.

When the instruction sequence of FIG. 2 is executed, instructions from "add a,b,c" to "bcc L" loop three times.

FIG. 3 shows a flow of a pipeline formed when the instruction sequence of FIG. 2 is executed, the pipeline showing operations at each clock cycle. The pipeline comprises three stages: IF for fetching instructions; DEC for decoding instructions; and EX for executing instructions and generating effective addresses. An instruction fetched at IF stage is executed at EX stage two clock cycles later. After executing branch instruction "bcc L" at clock cycle 8, the processor recognizes instruction "add a,b,c" as the instruction to be executed next, and fetches instruction "add a,b,c" at clock cycle 9. That is, the processor invalidates instructions over two clock cycles after executing branch instruction "bcc L" at clock cycle 8, and executes instruction "add a,b,c" next. That means a pipeline stall over two clock cycles occurs each time the processor loops once.

There are three known methods for avoiding the branch hazard: (a) Delayed branch (see for example, David A. Patterson and John L. Hennesy, Computer Architecture—A Quantitative Approach, Morgan Kaufmann Publishers, 1990.); (b) Loop repeat; and (c) Branch target buffer.

(a) Delayed Branch

In this method, loops are scheduled when a compiler compiles a source program, and a valid instruction is moved to a branch-delay slot, namely an instruction position after a branch instruction. With this arrangement, no instruction is invalidated when a branch instruction is executed. The instructions to be moved to the branch-delay slot are a pre-branch instruction, a branch target instruction, and a post-branch instruction.

(b) Loop Repeat

In this method, entry and exit addresses of a loop, number of loops and the like are stored in an exclusive register in the processor before the loop is executed. With such an arrangement, an address where the program returns to in a loop does not need to be computed, and the branch hazard problem is solved.

(c) Branch Target Buffer

In this method, when the processor branches to a new address for the first time, a branch target address and a branch target instruction sequence are stored in an exclusive buffer in the processor called a branch target buffer. Then, when the program branches to the address stored in the branch target buffer, the stored branch target instruction sequence is fetched to be executed. With such an arrangement, when an instruction sequence starting from the same address is executed repeatedly, accessing to the branch target buffer will do in the second execution and after. Therefore, the instructions do not need to be fetched from an external memory, solving the branch hazard problem.

However, these prior-art techniques have the following problems:

(a) Delayed Branch

In this method, a branch instruction should not depend on its pre-branch instruction when the pre-branch instruction is moved to a branch-delay slot. Some pre-branch instructions may not meet this condition. Even when there is a pre-branch instruction meeting the above condition and the static scheduling has been completed, the program may wait for a while before an instruction in a branch-delay slot or an instruction to be executed after a branch is fetched at the execution. This is because, for example, an external memory in which these instructions are stored may be a low-speed device, or an external bus which is used to fetch such instructions may be occupied by another processing.

The same problem occurs when a branch target instruction or a post-branch instruction is moved to a branch-delay slot, and furthermore, the performance improvement depends on whether branches succeed or not. (b) Loop Repeat To use this method, the number of repetitions in a loop should be known before the loop is executed. That is, this method cannot be used if the number of repetitions is determined through the execution of the loop. Therefore, the use of this method is limited to operations such as a repetitive numeric operation with a fixed format. (c) Branch Target Buffer In this method, it must be checked whether a branch target address is stored in a branch target buffer each time the program branches. This increases the number of processes performed in a clock cycle, making it difficult for the program to speed up clock cycles.

SUMMARY OF THE INVENTION

The first object of the present invention, in consideration of the above mentioned problems, is to provide a compiler and a processor for processing loops at high speed, without being affected by a dependency between a branch instruction and the pre-branch or branch target instruction in loops in source programs, and without generating any branch hazard.

The second object of the present invention is to provide a compiler and a processor for processing loops at high speed, without a necessity of computing a branch target address each time the program returns to the entry of the loop.

The third object of the present invention is to provide a compiler and a processor for processing loops at high speed, without a necessity of judging whether high-speed loop processing can be applied to a loop process each time a branch instruction is executed.

The above objects are fulfilled by a compiler for generating a program containing a machine-language instruction sequence by compiling a source program, comprising: a loop detecting unit for detecting certain loops which exist in the source program and extracting information for specifying the loops; and a high-speed loop applying unit comprising: a first loop exclusive instruction generating unit for generating a first loop exclusive instruction which indicates a succeeding instruction is an entry of the loop and placing the first loop exclusive instruction immediately before the entry of the loop in the machine-language instruction sequence; and a second loop exclusive instruction generating unit for generating second loop exclusive instructions which direct the program to branch to the entry of the loop and placing the second loop branch to the entry of the loop and placing the second loop exclusive instructions at places from where the program branches to the entry of the loop, the first loop exclusive instruction generating unit and the second loop exclusive instruction generating unit operating based on the information extracted by the loop detecting unit.

The instruction sequence output from the above compiler is processed by a processor, comprising: a pipeline comprising: a fetching unit for fetching instructions one by one from the instruction sequence; a decoding unit for decoding the instructions fetched by the fetching unit; and an executing unit for executing the instructions decoded by the decoding unit; a branch target storage unit; a registering unit for, after the decoding unit has decoded a first loop exclusive instruction, registering branch target information related to an instruction succeeding to the first loop exclusive instruction in the branch target storage unit; and a branch executing unit for, after the decoding unit has decoded a second loop exclusive instruction, judging whether to execute a loop, if judges to execute, reading the branch target information registered in the branch target storage unit, and controlling the pipeline so that the program executes the loop using the read branch target information.

When the machine-language instruction sequence generated by the compiler is executed by the processor, the processor does not need to compute an address, nor fetch an instruction and decode the instruction to repeat the process of the loop.

The processor may further comprise a clearing unit for, after the decoding unit has decoded a third loop exclusive instruction, clearing the branch target information registered in the branch target storage unit.

With such arrangements, since unnecessary branch target information is cleared, the control of the pipeline by the branch target executing unit is simplified even if multiple pieces of branch target information is registered in the branch target storage unit in such a case as multiple loop nesting.

The branch target information may be the address of an instruction succeeding to the first loop exclusive instruction, and the branch executing unit, if having judged to execute a loop, may use the address to control the pipeline.

With such arrangements, since unnecessary branch target information is cleared, the control of the pipeline by the branch target executing unit is simplified even if multiple pieces of branch target information is registered in the branch target storage unit in such a case as multiple loop nesting.

The branch target information may be an address of an instruction succeeding to the first loop exclusive instruction and a certain number of instructions succeeding to the first loop exclusive instruction, and the branch executing unit, if having judged to execute a loop, may use the address and an address which is obtained by performing a certain computation on an address specified by the second loop exclusive instruction to control the pipeline.

With such arrangements, the processor, if it executes a loop, does not need to compute the first address of the loop, nor fetch an instruction sequence starting from the first instruction, nor compute an address for an instruction sequence succeeding to the instruction sequence. The branch target information may be an address of an instruction succeeding to the first loop exclusive instruction and a certain number of instructions succeeding to the first loop exclusive instruction, and the branch executing unit, if having judged to execute a loop, may use the information to control the pipeline.

With such arrangements, the processor, if it executes a loop, does not need to compute the first address of the loop, nor fetch an instruction sequence starting from the first instruction, nor compute an address for an instruction sequence succeeding to the instruction sequence. The branch target information may be a first address of an instruction succeeding to the first loop exclusive instruction, a certain number of instructions succeeding to the first loop exclusive instruction, and a second address of an instruction which is to be executed immediately after the certain number of instructions, and the branch executing unit, if having judged to execute a loop, may use the information to control the pipeline.

With such arrangements, the processor, if it executes a loop, does not need to compute the first address of an instruction succeeding to the first loop exclusive instruction, nor fetch a certain number of instructions succeeding to the first loop exclusive instruction, nor compute the second address of an instruction which is to be executed immediately after the certain number of instructions.

The branch target information may be a certain number of instructions succeeding to the first loop exclusive instruction and an address of an instruction which is to be executed immediately after the certain number of instructions in the branch target storage unit, and the branch executing unit, if having judged to execute a loop, may use the information and an address specified by the second loop exclusive instruction to control the pipeline.

With such arrangements, the processor, if it executes a loop, does not need to compute the first address of an instruction succeeding to the first loop exclusive instruction, nor fetch a certain number of instructions succeeding to the first loop exclusive instruction, nor compute the address for the instruction sequence which is to be executed immediately after the certain number of instructions.

The branch target information may be a certain number of instructions succeeding to the first loop exclusive instruction and an address of an instruction which is to be executed immediately after the certain number of instructions, and the registering unit, after the decoding unit has decoded a first loop exclusive instruction, may use the information to control the pipeline.

With such arrangements, the processor, if it executes a loop, does not need to fetch a certain number of instructions succeeding to the first loop exclusive instruction, nor compute the address for the instruction sequence which is to be executed immediately after the certain number of instructions.

The branch target information may be an address of an instruction succeeding to the first loop exclusive instruction and a decoded certain number of instructions succeeding to the first loop exclusive instruction, and the branch executing unit, if having judged to execute a loop, may use the information and an address obtained by performing a certain computation on the address specified by the second loop exclusive instruction to control the pipeline.

With such arrangements, the processor, if it executes a loop, does not need to compute the first address of an instruction succeeding to the first loop exclusive instruction, nor fetch and decode a certain number of instructions succeeding to the first loop exclusive instruction, nor compute the address for the instruction sequence which is to be executed immediately after the certain number of instructions.

The branch target information may be an address of an instruction succeeding to the first loop exclusive instruction and a decoded certain number of instructions succeeding to the first loop exclusive instruction, and the branch executing unit, if having judged to execute a loop, may use the information to control the pipeline.

With such arrangements, the processor, if it executes a loop, does not need to compute the first address of an instruction succeeding to the first loop exclusive instruction, nor fetch and decode a certain number of instructions succeeding to the first loop exclusive instruction.

The branch target information may be a first address of an instruction succeeding to the first loop exclusive instruction, a decoded certain number of instructions succeeding to the first loop exclusive instruction, and a second address of an instruction which is to be executed immediately after the certain number of instructions, and the branch executing unit, if having judged to execute a loop, may use the information to control the pipeline.

With such arrangements, the processor, if it executes a loop, does not need to compute the first address of an instruction succeeding to the first loop exclusive instruction, nor fetch and decode a certain number of instructions succeeding to the first loop exclusive instruction, nor compute the address for the instruction sequence which is to be executed immediately after the certain number of instructions.

The branch target information may be a decoded certain number of instructions succeeding to the first loop exclusive instruction and an address of an instruction to be executed immediately after the first loop exclusive instruction, and the branch executing unit, if having judged to execute a loop, may use the information to control the pipeline.

With such arrangements, the processor, if it executes a loop, does not need to compute the first address of an instruction succeeding to the first loop exclusive instruction, nor fetch and decode a certain number of instructions succeeding to the first loop exclusive instruction, nor compute the address for the instruction sequence which is to be executed immediately after the certain number of instructions.

The branch target information may be a decoded certain number of instructions succeeding to the first loop exclusive instruction and an address of an instruction to be executed immediately after the first loop exclusive instruction, and the branch executing unit, if having judged to execute a loop, may use the information to control the pipeline.

With such arrangements, the processor, if it executes a loop, does not need to fetch and decode a certain number of instructions succeeding to the first loop exclusive instruction, nor compute the address for the instruction sequence which is to be executed immediately after the certain number of instructions.

As apparent from the above description, the present apparatus generates a high-speed loop instruction when compiling a source program, and registers the first address of a loop in an exclusive buffer in the processor, during the execution of the first repetition in the loop. After decoding a branch instruction designating a loop, the processor can obtain the address from the buffer.

Consequently, the present apparatus does not need to invalidate the pipeline, nor compute the branch address, nor fetch the branch target instruction from a low-speed external memory for each repetition of the process of the loop, and repeats the process of the loop at high-speed.

Also, since the present apparatus includes high-speed loop instructions and an unit for executing the instructions that are unique to the apparatus, the apparatus can register branch target instructions in the exclusive buffer independent from the operation of branch instructions. Furthermore, the number of loops does not need to be known even before the loop is executed because a loop exclusive instruction of the apparatus judges whether to execute a loop each time a loop ends, and the instructions or addresses registered in the exclusive buffer is used only when it is judged to execute a loop.

As a result, the present apparatus is effective in processing loops at high speed because the apparatus is independent from the contents of the loops or the number of repetitions in the loops.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 shows a source program in which an addition and a multiplication between two integers are repeated three times each.

FIG. 2 shows a machine-language instruction sequence obtained by compiling the source program using a prior-art compiler.

FIG. 7 shows machine-language instruction sequence 106 used in the embodiments of the present invention.

DESCRIPTION OF THE PREFERRED EMBODIMENT

Preferred embodiments of the present invention are explained below with reference to the drawings.

<First Embodiment>
<Construction>

Figure 4:
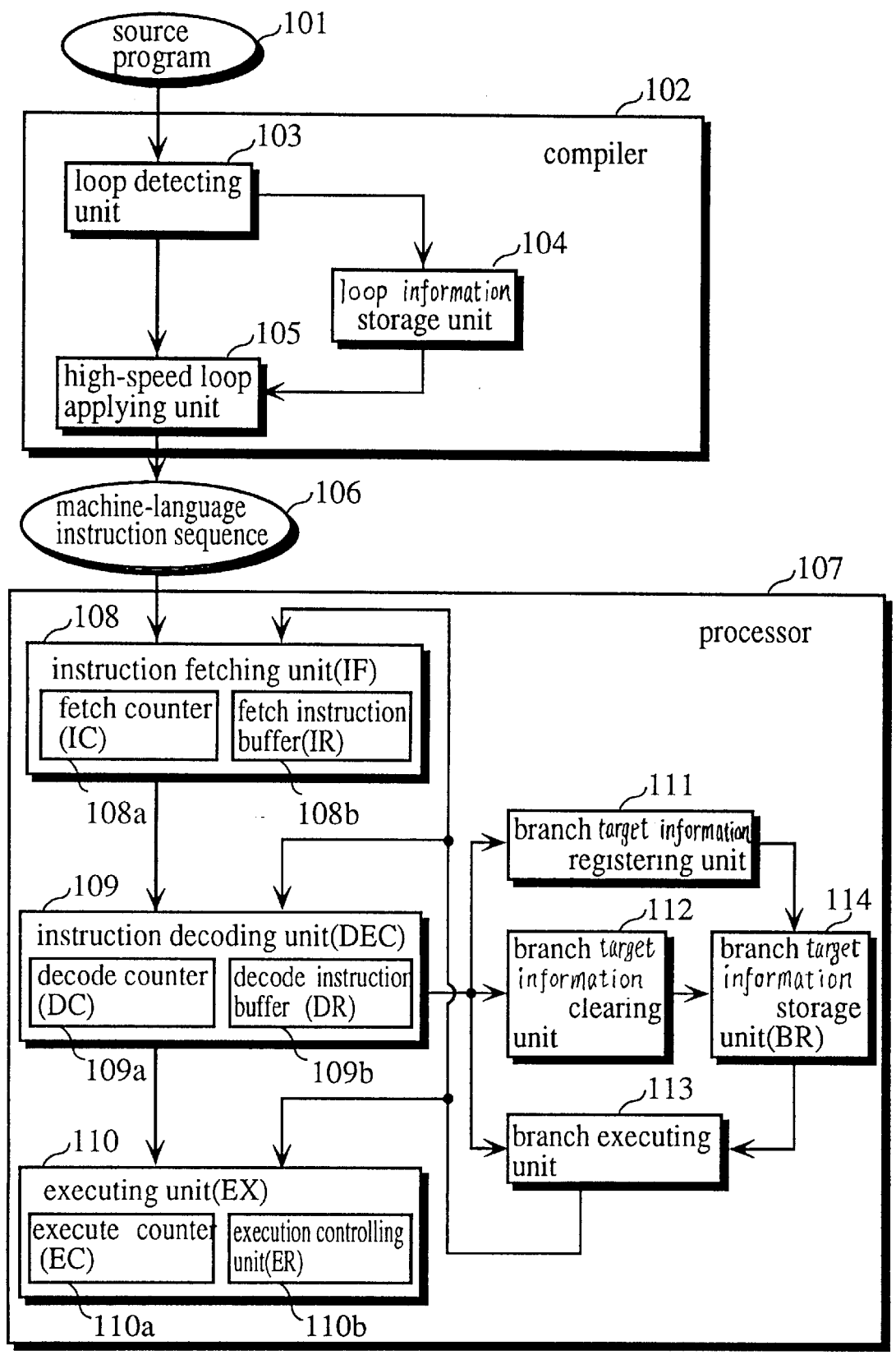
FIG. 4 is a block diagram showing a construction of a data processing apparatus used in First to Eleventh Embodiments of the present invention.

FIG. 4 is a block diagram showing a construction of a data processing apparatus of First Embodiment of the present invention. Note that FIG. 4 also shows source program 101 to be processed by the present apparatus and machine-language instruction sequence 106 generated by the present apparatus intermediately.

The present apparatus is divided into compiler 102 and processor 107 as a whole.

Compiler 102 compiles source program 101 written in a high-level language into a machine-language instruction sequence and outputs the sequence as machine-language instruction sequence 106. Compiler 102 comprises loop detecting unit 103, loop storage unit 104, and high-speed loop applying unit 105.

Loop detecting unit 103 detects all loops in a given source program that satisfies certain conditions, stores positional information for specifying the entries and exits of the detected loops as loop information into loop storage unit 104. Note that a term "loop" used in this document indicates such a loop as having one entry and one or more exits and having no possibility to overlap with another loop. Also note that the entry of a loop is a place where the first executable instruction of the loop is written; and the exit of a loop a place where the last executable instruction in a repetition in a loop is written.

Loop detecting unit 103 detects loops after checking whether certain instructions such as "do" or "while" instruction are written in the source program. Alternatively, loop detecting unit 103 may detect loops by analyzing the flow of the control (see for example, Alfred V. Aho, Ravi Setchi, and Jeffrey D. Ullman, Compilers Principles, Techniques, and Tools, Addion-Wesley Publishing Company, 1985.) Note that "all loops in a given source program that satisfies certain conditions" are the following loops:

(a) Independent loops which are not nested in other loops or do not have any nested loops in themselves.

(b) Up to two nested loops from innermost when one or more loops are nested in a loop.

The reason why only two loops are allowed in (b) is that processes of loops are limited by the capacity of branch target storage unit 114 (explained later).

Loop storage unit 104 comprises a RAM and other components and temporarily stores the loop information sent from loop detecting unit 103 for each loop. The loop information comprises positional information for specifying statements in the source program that correspond to entries and exits of the loops.

High-speed loop applying unit 105 generates three types of machine-language instructions (hereinafter high-speed loop instructions) for high-speed loop processing. The three types of high-speed loop instructions are as follows:

Branch target registering instruction which is written at a place immediately before the entry of a loop;

Branch target clearing instruction which is written immediately after an exit of a loop; and Loop exclusive branching instruction which is written at each place to branch to the entry of a loop. "A place immediately before the entry of a loop" has an instruction which is executed after the program leaves the loop. "Each place to branch to the entry of a loop" is each place from where the program may return to the entry of the loop to repeat the process.

Note that all the statements in the source program other than those of loops are also compiled by compiler 102 to machine-language instructions. These processes are not explained here because they are the same as those by general compilers.

Processor 107 receives machine-language instruction sequence 106 from compiler 102, then fetches the instructions one by one from the sequence to decode and execute the instructions. Processor 107 comprises instruction fetching unit 108, instruction decoding unit 109, executing unit 110, branch target registering unit 111, branch target clearing unit 112, branch executing unit 113, and branch target storage unit 114. Each component of processor 107 operates synchronously with a clock signal from a clock generator which is not shown in the figures. A pipeline comprises instruction fetching unit 108, instruction decoding unit 109, and executing unit 110, and each unit sequentially transfers an instruction to another unit in the direction shown in the figure, synchronizing with the clock signal.

Instruction fetching unit 108 fetches an instruction at one clock cycle from machine-language instruction sequence 106 which is stored in an external memory (not shown in the figures), then sends the instruction to instruction decoding unit 109 at the next clock cycle. Instruction fetching unit 108 comprises fetch counter 108a and fetch instruction buffer 108b.

Fetch counter 108a designates an address of an instruction to be fetched next, and outputs the address to the external memory which stores machine-language instruction sequence 106. After the instruction is fetched, the value of fetch counter 108a is incremented by one by incrementing device which is not shown in the figures, and updated to an address to be fetched next. However, if a direction comes from branch executing unit 113, the direction takes priority over the above process, then the value of fetch counter 108a is updated to an address sent from branch executing unit 113.

Fetch instruction buffer 108b comprises a register and stores an instruction fetched from machine-language instruction sequence 106.

Instruction decoding unit 109 comprises decode counter 109a and decode instruction buffer 109b, and decodes instructions stored in decode instruction buffer 109b. When instruction decoding unit 109 judges that the instruction stored in decode instruction buffer 109b is any of high-speed loop instructions, instruction decoding unit 109 activates any of branch target registering unit 111, branch target clearing unit 112, and branch executing unit 113 according to the stored high-speed loop instruction. On the other hand, when it is judged that the instruction stored in decode instruction buffer 109b is an instruction other than high-speed loop instructions, instruction decoding unit 109 decodes the instruction and sends the decoded instruction to executing unit 110. Note that instructions decoded by instruction decoding unit 109 are also called micro instructions.

Decode counter 109a stores an address in the external memory of the instruction being now stored in decode instruction buffer 109b. Generally, decode counter 109a stores an address sent from fetch counter 108a. However, if a direction comes from branch executing unit 113, the value of decode counter 109a is updated to an address sent from branch executing unit 113.

Decode instruction buffer 109b stores an instruction sent from fetch instruction buffer 108b or branch executing unit 113.

Executing unit 110 comprises execute counter 110a and execution controlling unit 110b.

Execute counter 110a stores an address of the micro instruction executed by executing unit 110 in the external memory. Generally, execute counter 110a stores an address sent from decode counter 109a. However, if a direction comes from branch executing unit 113, the value of execute counter 110a is updated to an address sent from branch executing unit 113.

Execution controlling unit 110b comprises an Arithmetic Logic Unit (ALU) and a shifter, controls the components of processor 107 according to a micro instruction sent from instruction decoding unit 109 or branch executing unit 113, and inputs or outputs control signals connected to processor 107, not shown in the figures.

Branch target registering unit 111 is activated by instruction decoding unit 109 when the unit 109 judges that an instruction stored in decode instruction buffer 109b is a branch target registering instruction. The activated branch target registering unit 111 reads an address in decode counter 109a and an instruction in decode instruction buffer 109b at the next clock cycle, and registers them in branch target storage unit 114 as branch target information.

Branch target clearing unit 112 is activated by instruction decoding unit 109 when the unit 109 judges that an instruction stored in decode instruction buffer 109b is a branch target clearing instruction. The activated branch target clearing unit 112 clears a pair of pieces of branch target information registered in branch target storage unit 114.

Branch executing unit 113 is activated by instruction. decoding unit 109 when the unit 109 judges that an instruction stored in decode instruction buffer 109b is a loop exclusive branching instruction. The activated branch executing unit 113 reads a pair of pieces of branch target information registered in branch target storage unit 114, stores the address into fetch counter 108a, then at the next clock cycle, stores the read instruction into decode instruction buffer 109b.

Branch target storage unit 114 comprises Last In First Out (LIFO) latches, and has a capacity of two pairs of pieces of branch target information at maximum. The branch target information is written on the unit 114 by branch target registering unit 111 and cleared by branch target clearing unit 112.

<Operation>

Figure 5:
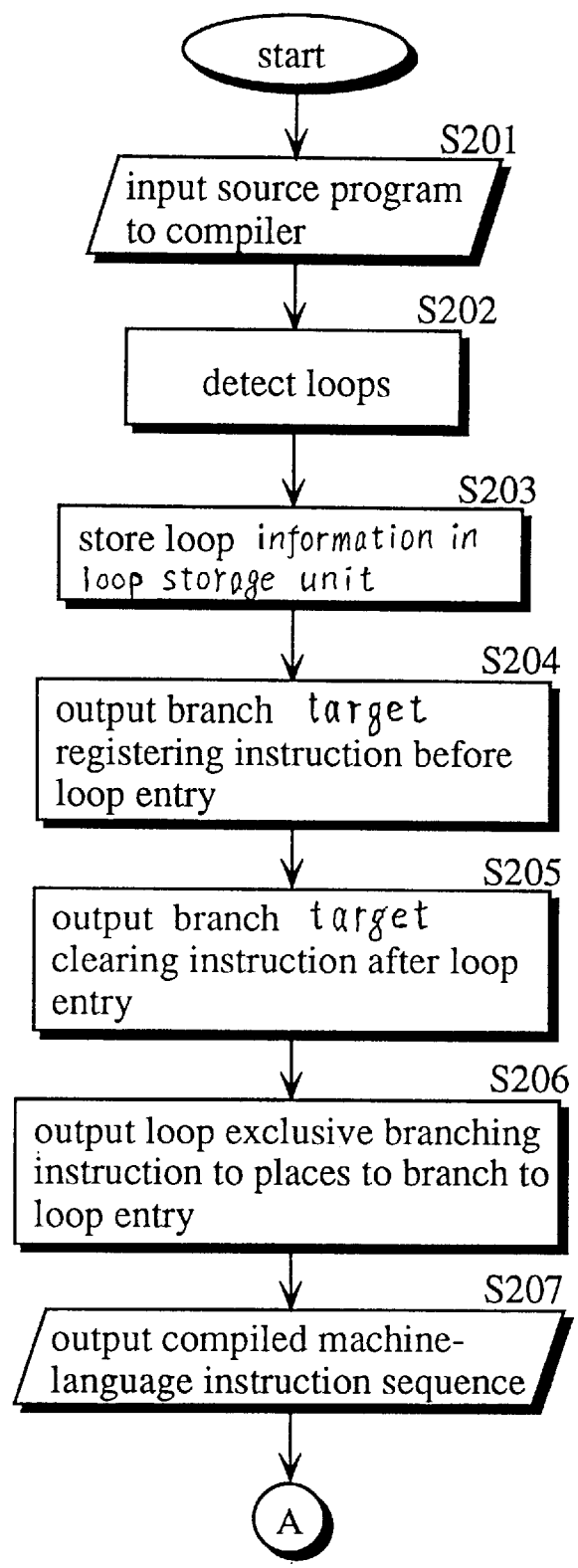
FIG. 5 is a flowchart of an operational procedure of compiler 102 us in the embodiments of the present invention.
Figure 6:
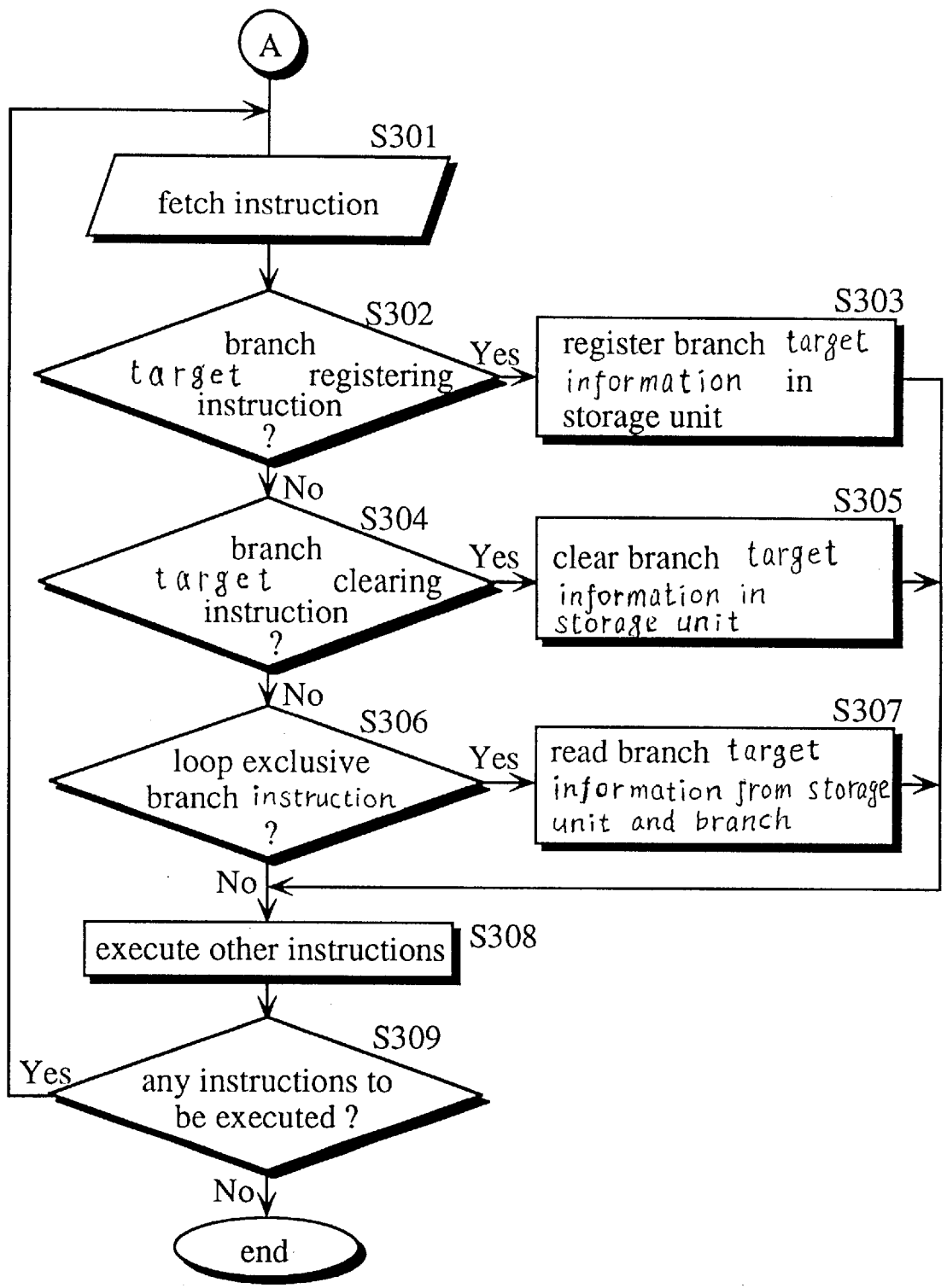
FIG. 6 is a flowchart of an operational procedure of processor 107 used in the embodiments of the present invention.

Now, how the data processing apparatus with the above construction operates is explained. FIGS. 5 and 6 are flow-charts of compiler 102 and processor 107 of the present apparatus.

Suppose a source program shown in FIG. 1 is input to compiler 102.

When the source program is input to compiler 102 (step S201), loop detecting unit 103 detects loops included in the source program (step S202). In the source program of FIG. 1, a "for" statement designates a loop. Therefore, loop detecting unit 103 stores positional information specifying the entry and exit of the loop into loop storage unit 104 (step S203).

High-speed loop applying unit 105 reads loop information stored in loop information storage unit 104, and outputs branch target registering instruction "set" to the place immediately before the entry of the loop (step S204); branch target clearing instruction "clr" immediately after the exit (step S205); and loop exclusive branching instruction "lcc L" to places to branch to the entry of the loop (step S206). Note that compiler 102 outputs general execution instructions for the other parts of the source program.

Machine-language instruction sequence 106 shown in FIG. 7 output by compiler 102 and the machine-language instruction sequence shown in FIG. 2 output by the prior-art apparatus are results of compiling the same source program. As understood from the comparison between the two figures, the machine-language instruction sequence of FIG. 7 additionally has branch target registering instruction "set" and branch target clearing instruction "clr", and branching instruction "bcc L" in FIG. 2 is replaced by loop exclusive branching instruction "lcc L".

Machine-language instruction sequence 106 is output to the external memory and is executed by processor 107 (steps; S301 to S309).

Instruction fetching unit 108 fetches instructions one by one from machine-language instruction sequence 106 (step S301).

The fetched instruction is transferred to instruction decoding unit 109 and decoded at the next clock cycle (steps S302 to S307). When the unit 109 judges as a result of the decoding that the instruction is any of high-speed loop instructions "set", "clr", and "lcc", a process according to the instruction is performed (steps S303, S305, and S307). If the instruction is not any of high-speed loop instructions, the decoded instruction is transferred to executing unit 110 at the next clock cycle and executed (step S308).

Steps S301 to S308 are repeated until the last instruction of machine-language instruction sequence 106 has been executed (step S309).

Now, it is explained in detail on how each component of processor 107 operates when high-speed loop instruction "set", "clr", or "lcc" is executed.

Figure 8:
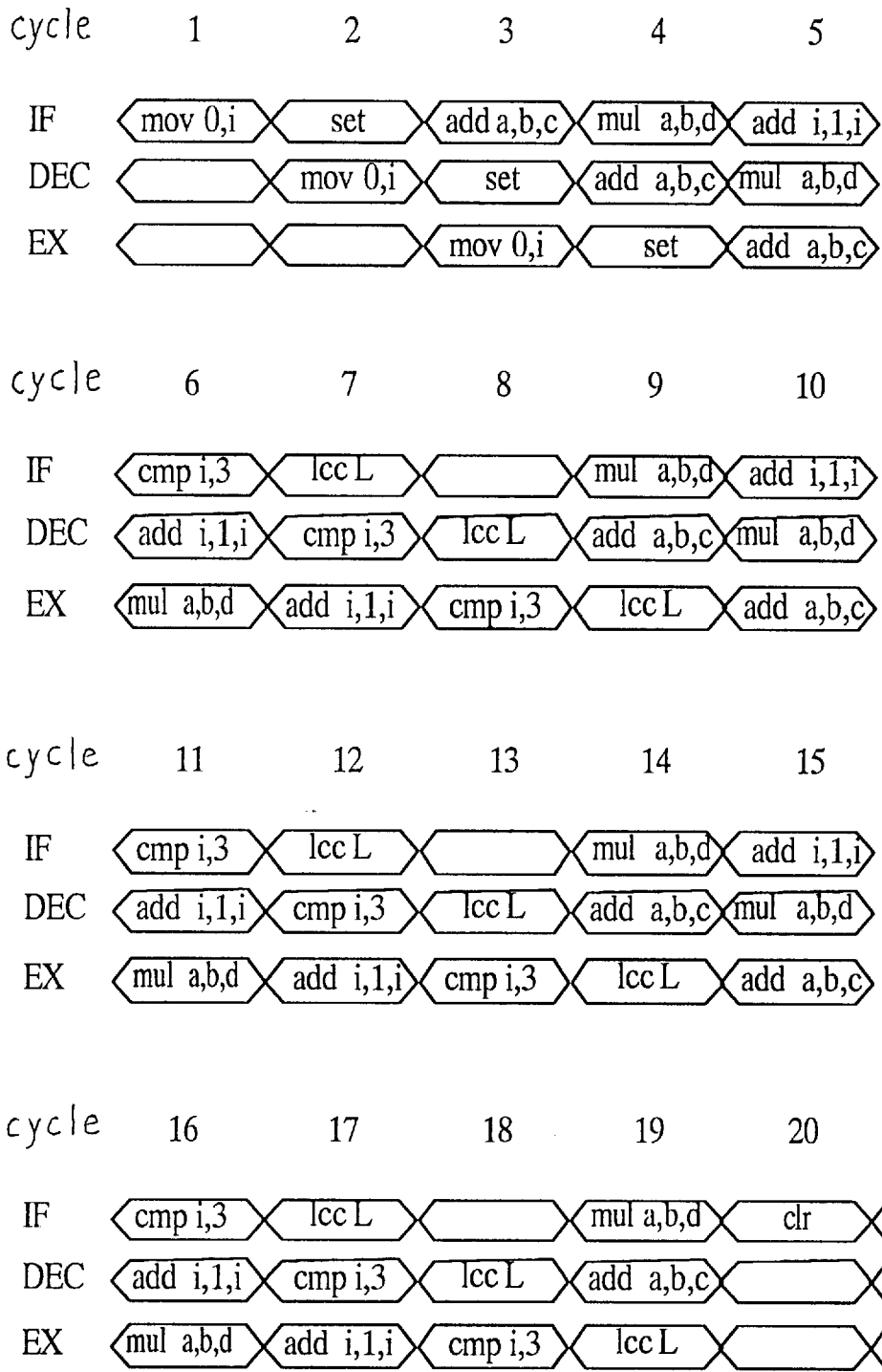
FIG. 8 shows a flow of a pipeline formed when processor 107 executes the instruction sequence of FIG. 7 in First Embodiment.

FIG. 8 shows how units 108 to 110 of a pipeline in processor 107 operate when the machine-language instruction sequence shown in FIG. 7 is executed. Columns of "IF", "DEC", and "EX" in FIG. 8, show instructions fetched by instruction fetching unit 108, instruction decoding unit 109, and executing unit 110 respectively.

Branch target registering instruction "set" fetched at clock cycle 2 is transferred to decode instruction buffer 109b at clock cycle 3. Then, instruction decoding unit 109 recognizes the instruction transferred to decode instruction buffer 109b as branch target registering instruction "set", and activates branch target registering unit 111.

The activated branch target registering unit 111 reads an address in decode counter 109a and an instruction in decode instruction buffer 109b at the next clock cycle, and registers them in branch target storage unit 114 as branch target information. In this case, the instruction is "add a,b,c", and the address is an address of the instruction in the external memory. Note that since branch target storage unit 114 has a capacity of up to two pairs of pieces of branch target information, after this pair of pieces of information have been registered, unit 114 has a remaining capacity of one more pair of pieces of branch target information.

Loop exclusive branching instruction "lcc" fetched at clock cycle 7 is transferred to decode instruction buffer 109b at clock cycle 8. Then, instruction decoding unit 109 recognizes the instruction transferred to decode instruction buffer 109b as loop exclusive branching instruction "lcc", and activates branch executing unit 113. The activated branch executing unit 113 transfers a value to fetch counter 108a. This value is obtained by adding "4", representing a size of instruction "add a,b,c", to an address registered in branch target storage unit 114. The value is equal to an address of an instruction stored after instruction "add a,b,c". Branch executing unit 113 then transfers an address and an instruction registered in branch target storage unit 114 to decode counter 109a and decode instruction buffer 109b respectively.

As a result, at clock cycle 9, instruction fetching unit 108 fetches instruction "mul a,b,d" from the external memory, instruction decoding unit 109 decodes instruction "add a,b, c" and its address sent from branch target storage unit 114, and executing unit 110 executes instruction "lcc L". When instruction "lcc L" is executed, a judgement the same as that of instruction "bcc L" is done. In this case, it is judged that the program should repeat the process, according to the result of the previously executed instruction "cmp i,3". As a result, the second repetition in the loop is processed through clock cycles 10 to 14.

Figure 9:
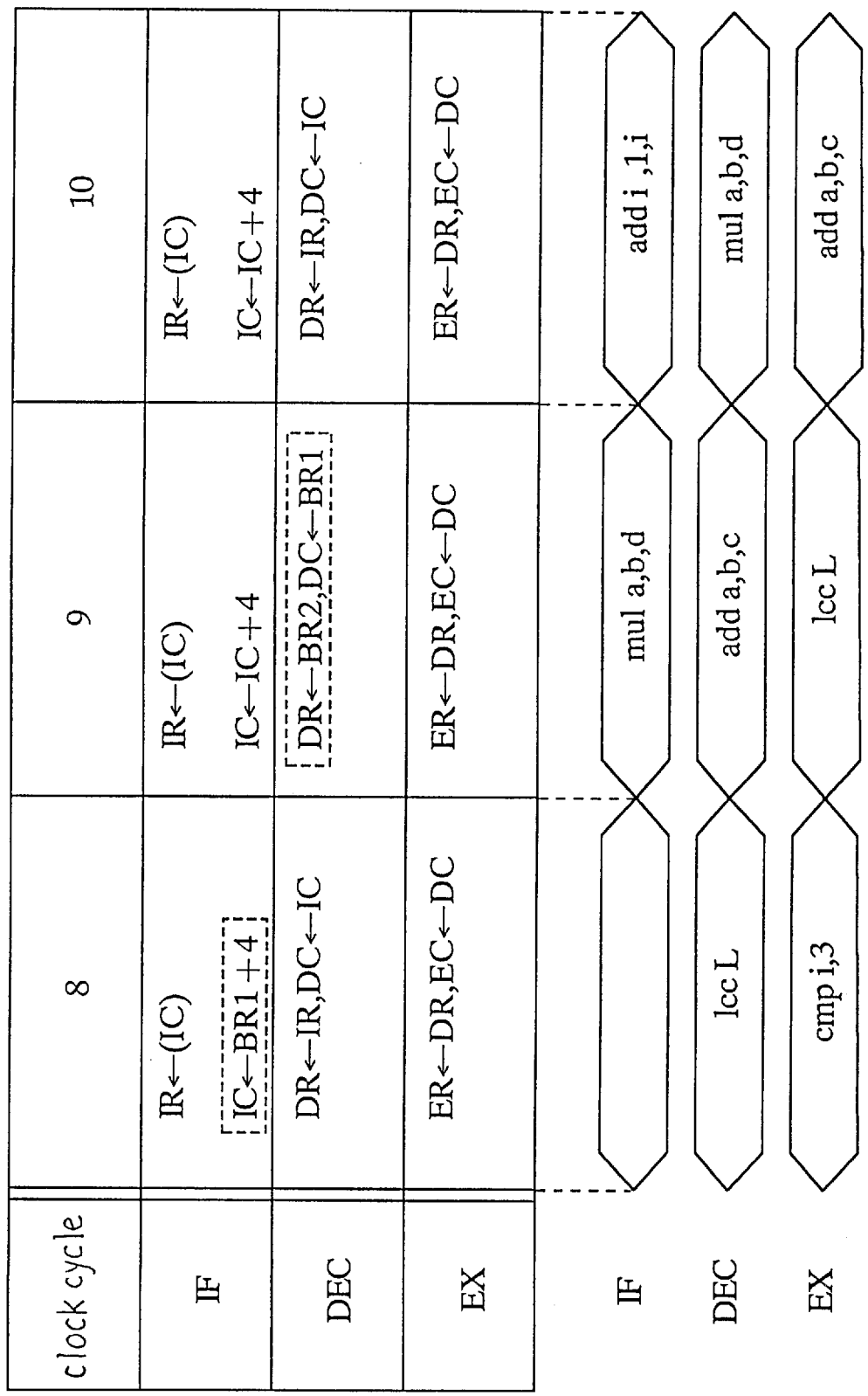
FIG. 9 His a table showing the pipeline at clock cycles 8 to 10 using symbols.

In FIG. 9, symbols "IR", "IC", "DR", "DC", "ER", and "EC" stand for components of units 108 to 110 shown in FIG. 4, and are used to indicate how information of address or instruction is transferred. BR1 and BR2 represent parts of branch target storage unit 114, and are used to indicate respectively the address of instruction "add a,b,c" and instruction "add a,b,c" in this case. Operations related to loop exclusive branching instruction "lcc" are characteristic of the present apparatus, and are encircled by broken lines.

Symbols used at clock cycle 8 indicate as follows:
<Stage IF>
IR←(IC): An instruction stored in the external memory at an address stored in IC is transferred to IR.
IC←BR1+4: An address stored in BR1 is added by 4 and is transferred to IC.

In FIG. 9, the above transfers are described in two rows. It indicates that the transfer in the upper row is operated in the first half of one clock cycle, and the transfer in the lower row in the latter half. In this case, transfer IR←(IC) is operated first, then IC←BR1+4 is operated.

<Stage DEC>
DR←IR: An instruction stored in IR is transferred to DR.
DC←IC: An address stored in IC is transferred to DC.
In FIG. 9, the above transfers, DR←IR and DC←IC, are described in a row, indicating that the transfers are operated at the same time.
<Stage EX>
ER←DR: An instruction stored in DR is transferred to ER.
EC←DC: An address stored in DC is transferred to EC.
The above described operations of the pipeline at clock cycle 8 is the same as those at clock cycles 13 and 18.

When the third repetition in the loop is executed at clock cycles 15 to 18, the program judges, when executing instruction "lcc L" at clock cycle 19, that the loop should be ended, then fetches branch target clearing instruction "clr" placed immediately after the exit of the loop at clock cycle 20. The fetched branch target clearing instruction "clr" is transferred to decode instruction buffer 109 at the next clock cycle 21. Decode instruction buffer 109 recognizes the transferred instruction as branch target clearing instruction "clr", and activates branch target clearing unit 112.

The activated branch target clearing unit 112 clears instruction "add a,b,c" and its address registered in branch target storage unit 114. Note that branch target storage unit 114 resumes the capacity of two pairs of pieces of branch target information after the above operation.

As shown in the above description, the present apparatus generates high-speed loop instructions when compiling source programs, and the first instruction of the loop and its address are registered in branch target storage unit 114, an exclusive buffer in processor 107. After decoding a branch instruction which designates a loop, processor 107 does not need to compute a branch target address or fetch a branch target instruction from a low-speed external memory. Instead, processor 107 can obtain the branch target address and branch target instruction from branch target storage unit 114.

Figure 3:
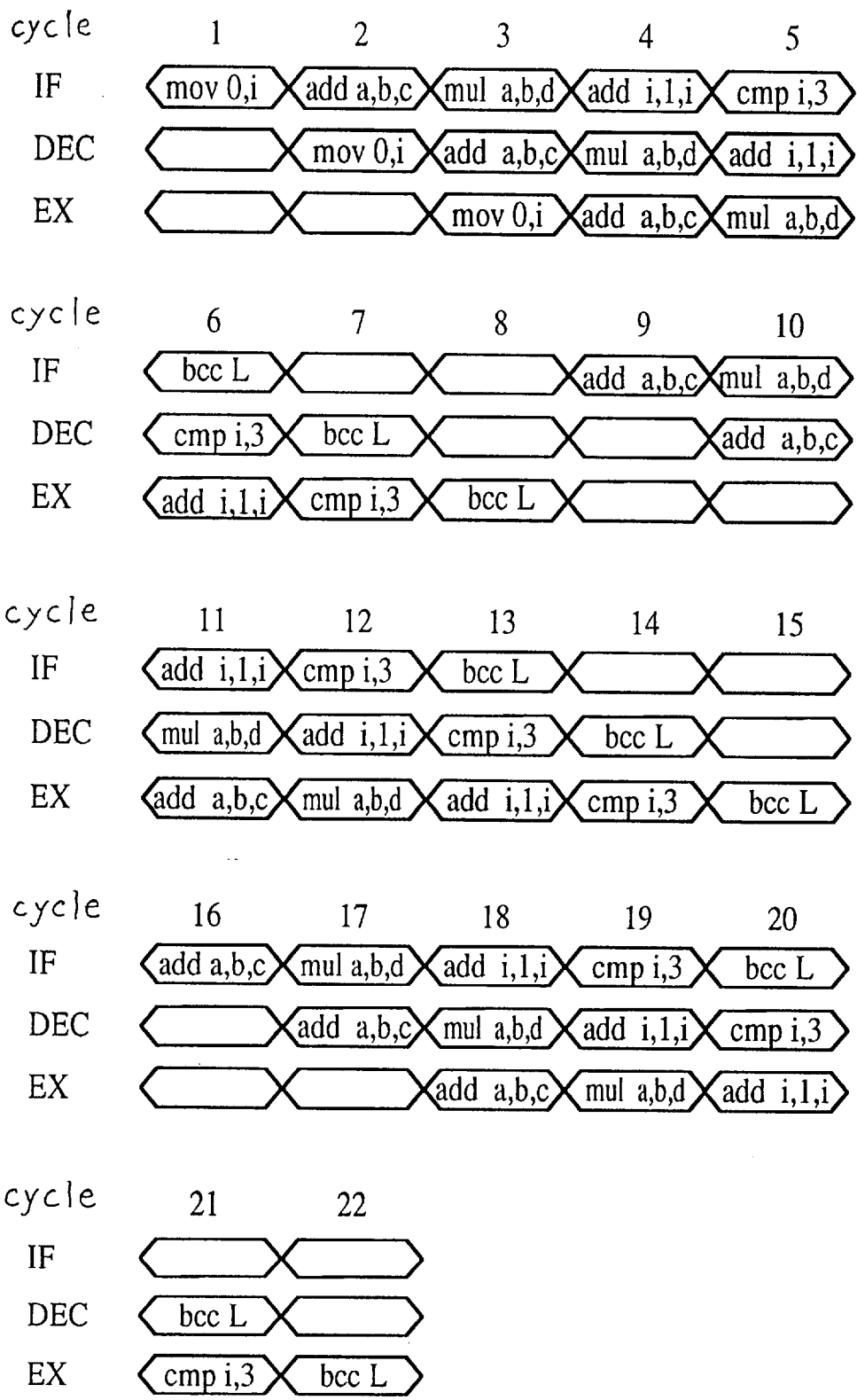
FIG. 3 shows a flow of a pipeline formed when a prior-art processor executes the instruction sequence of FIG. 2.

Consequently, it is apparent from a comparison between the pipelines of FIG. 3 and FIG. 8 that a branch hazard occurs in the conventional apparatus, but not in the present apparatus when a same program including a loop is compiled and executed. This indicates that the present apparatus has increased speed in loop processing.

<Second Embodiment>

Now, the data processing apparatus of Second Embodiment of the present invention is explained. The apparatus achieves high-speed loop processing by registering only the first address of a loop in an exclusive buffer.

In First Embodiment, the first instruction of a loop and its address are registered in branch target storage unit 114, which is an exclusive buffer in processor 107, while in Second Embodiment, only the address of the first instruction is registered.
<Construction>
The construction of the data processing apparatus of the present embodiment is the same as that of First Embodiment shown in FIG. 4. However, note that branch target storage unit 114 stores only the address of the first instruction of a loop.
<Operation>
The operation of the present apparatus is the same as that of First Embodiment shown in FIGS. 5 and 6 except that branch target registering instruction "set" and loop exclusive branching instruction "lcc" generate operations different from those of First Embodiment when executed. These points are explained below.

After branch target registering instruction "set" is transferred to decode instruction buffer 109b and branch target registering unit 111 is activated, the activated branch target registering unit 111 reads an address transferred to decode counter 109a at the next clock cycle, that is, an address of instruction "add a,b,c" in the external memory, and registers the address in branch target storage unit 114.

On the other hand, after loop exclusive branching instruction "lcc" is transferred to decode instruction buffer 109b and branch executing unit 113 is activated, the activated branch executing unit 113 transfers the address registered in branch target storage unit 114 to fetch counter 108a. Then, an instruction, namely "add a,b,c", is fetched from the external memory by referring to fetch counter 108a for its address.

Figure 10:
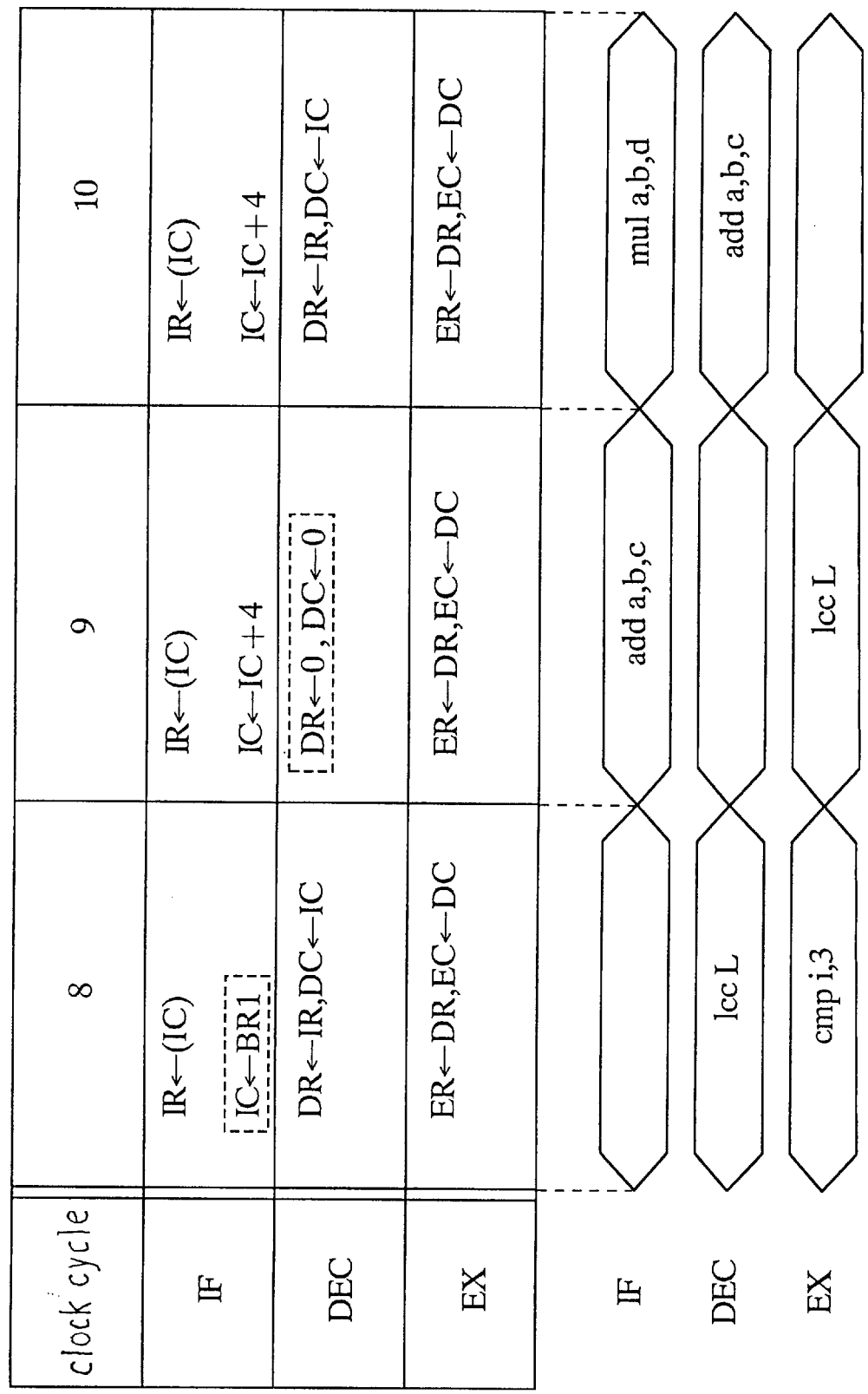
FIG. 10 shows a flow of the pipeline formed when the data processing apparatus executes loop exclusive branching instruction "lcc" in Second Embodiment.

FIG. 10 shows an operational flow in the pipeline at an execution of loop exclusive branching instruction "lcc". FIG. 10 corresponds to FIG. 9 in First Embodiment.

In stage IF at clock cycle 8, an instruction stored in the external memory at an address stored in IC is transferred to IR first, then, an address stored in BR1 is transferred to IC. Also, since a pipeline stall over one clock cycle occurs in the present embodiment as shown in FIG. 10, branch executing unit 113 transfers 0 to DR and DC in stage DEC at clock cycle 9 to invalidate the instruction in the stall.

As apparent from the above description, the present apparatus generates a high-speed loop instruction when compiling a source program, and registers the first address of a loop in branch target storage unit 114, an exclusive buffer in processor 107, during the execution of the first repetition in the loop. After decoding a branch instruction designating a loop, processor 107 does not need to compute branch target address and obtains the address from branch target storage unit 114.

As a result, it is apparent that the apparatus of Second Embodiment has reduced a branch hazard by one clock cycle in a pipeline compared with the conventional apparatus, increasing the speed of the loop processing.

<Third Embodiment>

The data processing apparatus of Third Embodiment of the present invention is explained. The apparatus achieves high-speed loop processing by registering the first instruction of a loop and its address in an exclusive buffer and by using an address specified by a loop exclusive branching instruction.

<Construction>

The construction of the data processing apparatus of the present embodiment is the same as that of First Embodiment shown in FIG. 4.

<Operation>

The operation of the present apparatus is the same as that of First Embodiment shown in FIGS. 5 and 6 except that loop exclusive branching instruction "lcc" generates an operation different from that of First Embodiment when executed. This is explained below.

After loop exclusive branching instruction "lcc" is transferred to decode instruction buffer 109b (DR) and branch executing unit 113 is activated, the activated branch executing unit 113 transfers an address specified by instruction "lcc L", namely a value of label "L" added by 4, to fetch counter 108a (IC). Then, at the next clock cycle, branch executing unit 113 transfers the address and instruction "add a,b,c" registered in branch target storage unit 114 to decode instruction counter 109a (DC) and decode instruction buffer 109b (DR) respectively.

Figure 11:
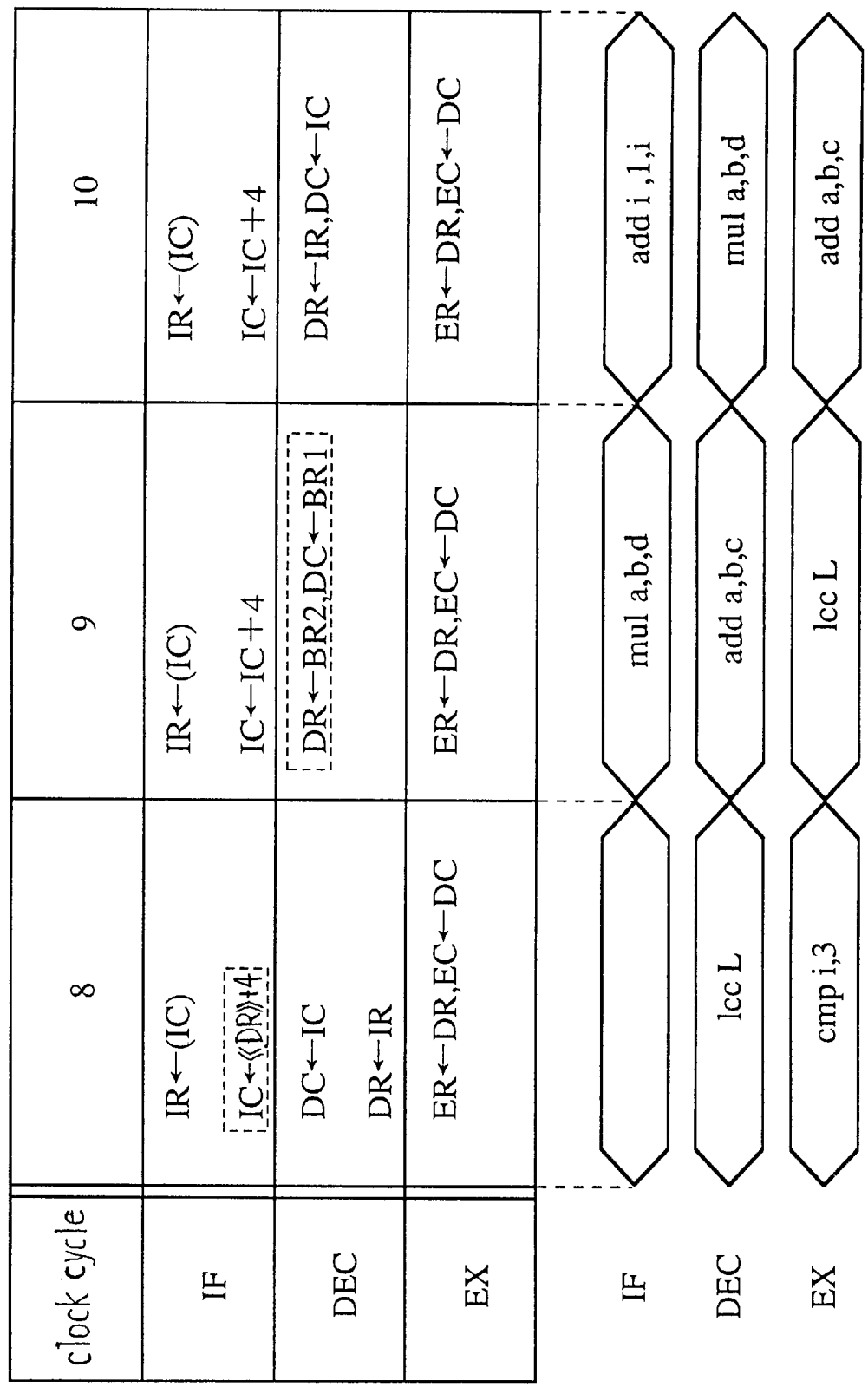
FIG. 11 shows a flow of the pipeline formed when the data processing apparatus executes loop exclusive branching instruction "lcc" in Third Embodiment.

FIG. 11 shows an operational flow in the pipeline at an execution of loop exclusive branching instruction "lcc". FIG. 11 corresponds to FIG. 9 in First Embodiment. "BR2" is used to indicate a branch target instruction, namely "add a,b,c" in this case; and "BR1" its address. Both values are registered in branch target storage unit 114. Also, "<<DR>>", stands for a part of an instruction stored in DR, and is used to indicate an address which is equal to a value obtained by adding 4to label "L", of the part, the address being that of the second instruction of the loop.

In stage IF at clock cycle 8, an instruction stored in IC is fetched first, then an address specified by the part of instruction stored in DR, a value of label "L" added by 4, is transferred to IC. Then, in DEC stage at clock cycle 9, an address stored in BR1 and an instruction stored in BR2 are transferred from branch target storage unit 114 to DC and DR. In the succeeding clock cycles, the program operates the same as First Embodiment.

As apparent from the above description, the present apparatus generates a high-speed loop instruction when a loop is detected during a compilation of a source program. The apparatus registers the first instruction of the loop and its address in branch target storage unit 114, which is an, exclusive buffer in processor 107, when the first repetition in the loop is executed. After decoding a branch instruction designating a loop, processor 107 does not need to compute a branch target address nor fetch a branch target instruction from a low-speed external memory, and obtains the instruction and its address from branch target storage unit 114 and also obtains an address of the second instruction from a part of a loop exclusive branching instruction.

As a result, it is apparent that the apparatus of Third Embodiment has deleted the branch hazard that occurs in the conventional apparatus, increasing the speed of the loop processing.

<Fourth Embodiment>

The data processing apparatus of Fourth Embodiment of the present invention is explained. The apparatus achieves high-speed loop processing by registering the loop's first instruction and its address and the address of the second instruction in an exclusive buffer, branch target storage unit 114.

<Construction>

The construction of the data processing apparatus of the present embodiment is the same as that of First Embodiment shown in FIG. 4, except that branch target storage unit 114 stores the address of the second instruction as well as the first instruction and its address.

<Operation>

The operation of the present apparatus is the same as that of First Embodiment shown in FIGS. 5 and 6 except that branch target registering instruction "set" and loop exclusive branching instruction "lcc" generate operations different from those of First Embodiment when executed. These points are explained below.

After branch target registering instruction "set" is transferred to decode instruction buffer 109b (DR) and branch target registering unit 111 is activated, the unit 111, at the next clock cycle, reads an address transferred to decode counter 109a and an instruction transferred to decode instruction buffer 109b, which is "add a,b,c", and registers the address, the instruction, and the address added by 4 in branch target storage unit 114.

On the other hand, after loop exclusive branching instruction "lcc" is transferred to decode instruction buffer 109b and branch executing unit 113 is activated, the activated branch executing unit 113 transfers the address of the second instruction registered in branch target storage unit 114 to fetch counter 108a. Then, branch executing unit 113 transfers instruction "add a,b,c" and its address to decode instruction buffer 109b and decode instruction counter 109a respectively.

Figure 12:
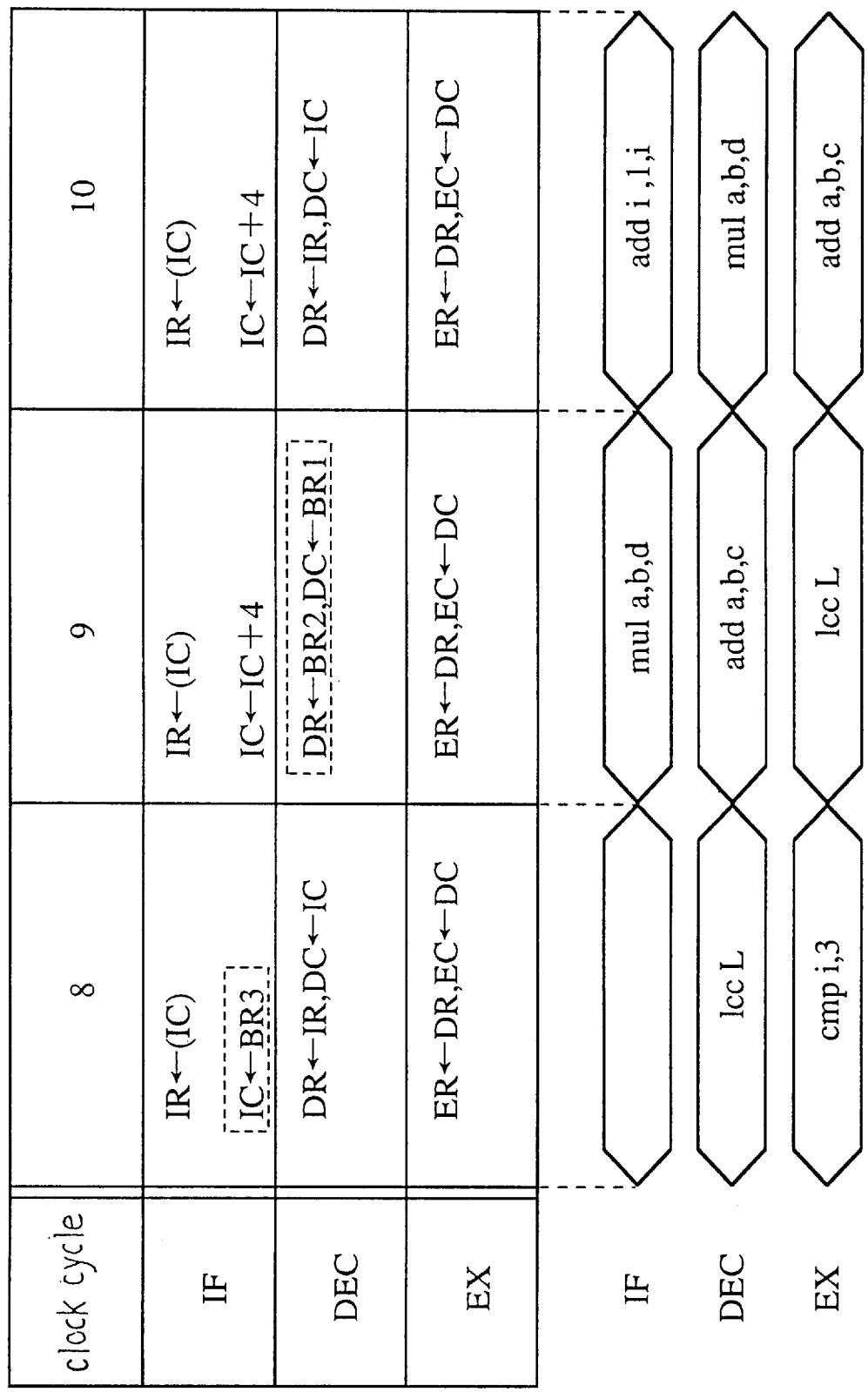
FIG. 12 shows a flow of the pipeline formed when the data processing apparatus executes loop exclusive branching instruction "lcc" in Fourth Embodiment.

FIG. 12 shows an operational flow in the pipeline at an execution of loop exclusive branching instruction "lcc". FIG. 12 corresponds to FIG. 9 in First Embodiment. "BR3" is used to indicate the address of the second instruction registered in branch target storage unit 114.

In stage IF at clock cycle 8, an instruction stored in the external memory at an address stored in IC is transferred to IR first, then, the address stored in BR3 is transferred to IC. Then, in stage DEC at clock cycle 9, the instruction stored in BR2 and the address stored in BR1 are transferred from branch target storage unit 114 to DR and DC respectively. In the succeeding clock cycles, the program operates the same as First Embodiment.

As apparent from the above description, the present apparatus generates a high-speed loop instruction when compiling a source program, and registers the first address, the first instruction, and the second address of a loop in branch target storage unit 114 during the execution of the first repetition in the loop. After decoding a branch instruction designating a loop, processor 107 does not need to compute branch target address and the next address, and obtains the addresses from branch target storage unit 114.

As a result, the apparatus of Fourth Embodiment has deleted the branch hazard that occurs in the conventional apparatus, increasing the speed of the loop processing.

<Fifth Embodiment>

The data processing apparatus of Fifth Embodiment of the present invention is explained. The apparatus achieves high-speed loop processing by registering the loop's first instruction and the second address in branch target storage unit 114 and by using a loop exclusive branching instruction for specifying the first address.

<Construction>

The construction of the data processing apparatus of the present embodiment is the same as that of First Embodiment shown in FIG. 4, except that branch target storage unit 114 stores the first instruction and the address of the second instruction.

<Operation>

The operation of the present apparatus is the same as that of First Embodiment shown in FIGS. 5 and 6 except that branch target registering instruction "set" and loop exclusive branching instruction "lcc" generate operations different from those of First Embodiment when executed. These points are explained below.

After branch target registering instruction "set" is transferred to decode instruction buffer 109b (DR) and branch target registering unit 111 is activated, the unit 111, at the next clock cycle, reads an address transferred to decode counter 109a and an instruction transferred to decode instruction buffer 109b, and registers the second address, which is obtained by adding 4 to the transferred address, and the instruction "add a,b,c" in branch target storage unit 114.

On the other hand, after loop exclusive branching instruction "lcc" is transferred to decode instruction buffer 109b and branch executing unit 113 is activated, the activated branch executing unit 113 transfers the address of the second instruction registered in branch target storage unit 114 to fetch counter 108a. Then, at the next clock cycle, branch executing unit 113 transfers the address specified by instruction "lcc", being equal to the value of label "L", from decode instruction buffer 109b to decode counter 109a first, then transfers instruction "add a,b,c" from unit 114 to decode buffer 109b.

Figure 13:
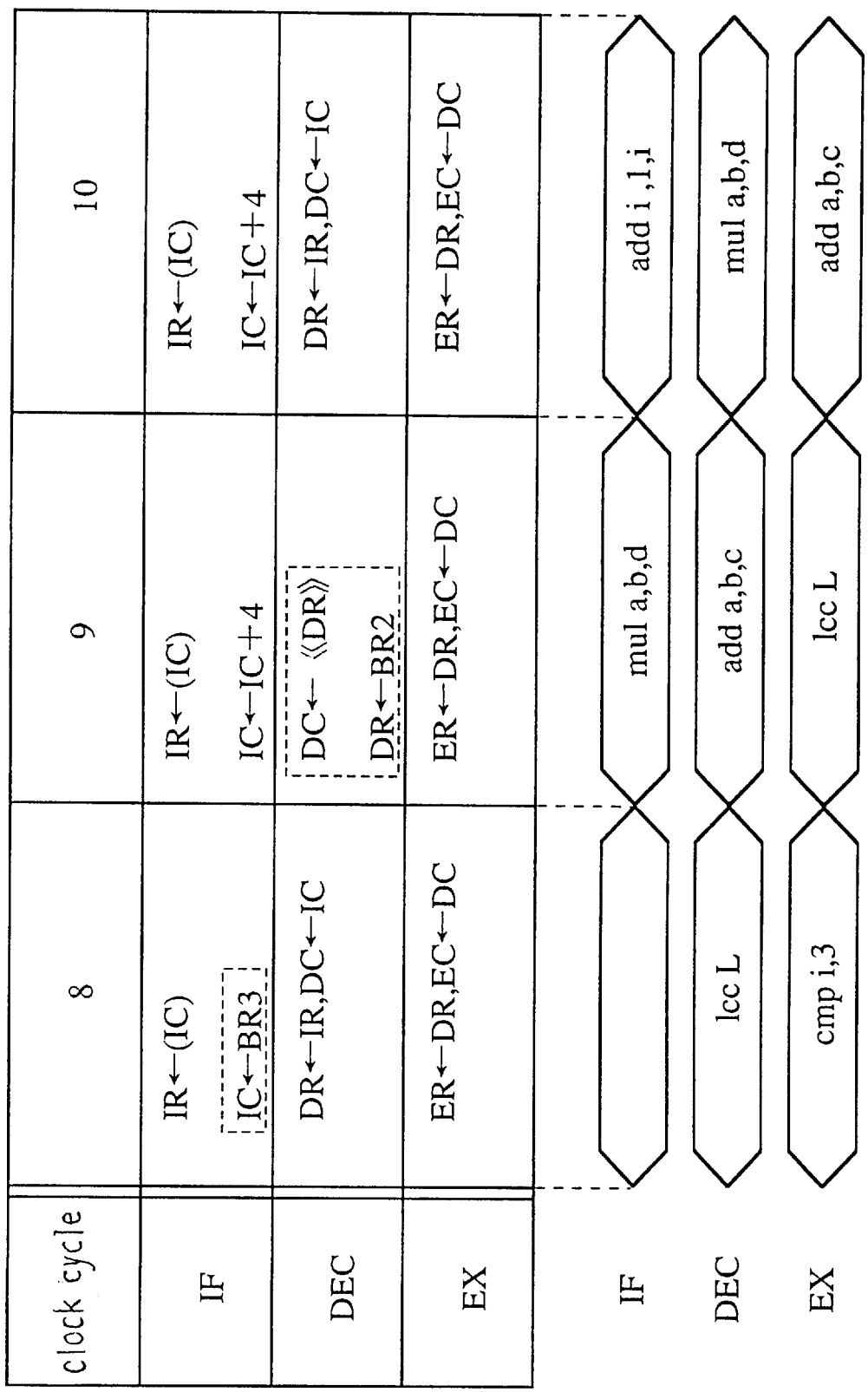
FIG. 13 shows a flow of the pipeline formed when the data processing apparatus executes loop exclusive branching instruction "lcc" in Fifth Embodiment.

FIG. 13 shows an operational flow in the pipeline at an execution of loop exclusive branching instruction "lcc". FIG. 13 corresponds to FIG. 9 in First Embodiment. "BR2" and "BR3" are used to indicate the instruction, "add a,b,c", and the address of the second instruction registered in branch target storage unit 114 respectively.

In stage IF at clock cycle 8, an instruction stored in the external memory at an address stored in IC is transferred to IR first, then, the address stored in BR3 is transferred to IC. Then, in stage DEC at clock cycle 9, a part of the instruction stored in DR is transferred to DC first, then the instruction stored in BR2 is transferred from branch target storage unit 114 to DR. In the succeeding clock cycles, the program operates the same as First Embodiment.

As apparent from the above description, the present apparatus generates a high-speed loop instruction when compiling a source program, and registers the first address, the first instruction, and the second address of a loop in branch target storage unit 114 during the execution of the first repetition in the loop. After decoding a branch instruction designating a loop, processor 107 does not need to compute branch target address and the next address, nor fetch the branch target instruction from a low-speed external memory, and obtains the addresses and instruction from branch target storage unit 114 and loop exclusive branching instruction "lcc L".

As a result, the apparatus of Fifth Embodiment has deleted the branch hazard that occurs in the conventional apparatus, increasing the speed of the loop processing.

<Sixth Embodiment>

The data processing apparatus of Sixth Embodiment of the present invention is explained. The apparatus achieves high-speed loop processing by registering the loop's first instruction and the second address in branch target storage unit 114 and by computing the first address with a certain expression.

<Construction>

The construction of the data processing apparatus of the present embodiment is the same as that of First Embodiment shown in FIG. 4, except that branch target storage unit 114 stores the first instruction and the address of the second instruction.

<Operation>

The operation of the present apparatus is the same as that of First Embodiment shown in FIGS. 5 and 6 except that branch target registering instruction "set" and loop exclusive branching instruction "lcc" generate operations different from those of First Embodiment when executed. These points are explained below.

After branch target registering instruction "set" is transferred to decode instruction buffer 109b (DR) and branch target registering unit 111 is activated, the unit 111, at the next clock cycle, reads an address transferred to decode counter 109a and an instruction transferred to decode instruction buffer 109b, and registers the second address,. which is made by adding 4 to the transferred address, and the instruction "add a,b,c" in branch target storage unit 114.

On the other hand, after loop exclusive branching instruction "lcc" is transferred to decode instruction buffer 109b and branch executing unit 113 is activated, the activated branch executing unit 113 transfers the address of the second instruction registered in branch target storage unit 114 to fetch counter 108a. Then, at the next clock cycle, branch executing unit 113 reads the address and instruction registered in branch target storage unit 114, adds 4 to the address, then transfers the result address and the instruction, "add a,b,c" from unit 114 to decode buffer 109b.

Figure 14:
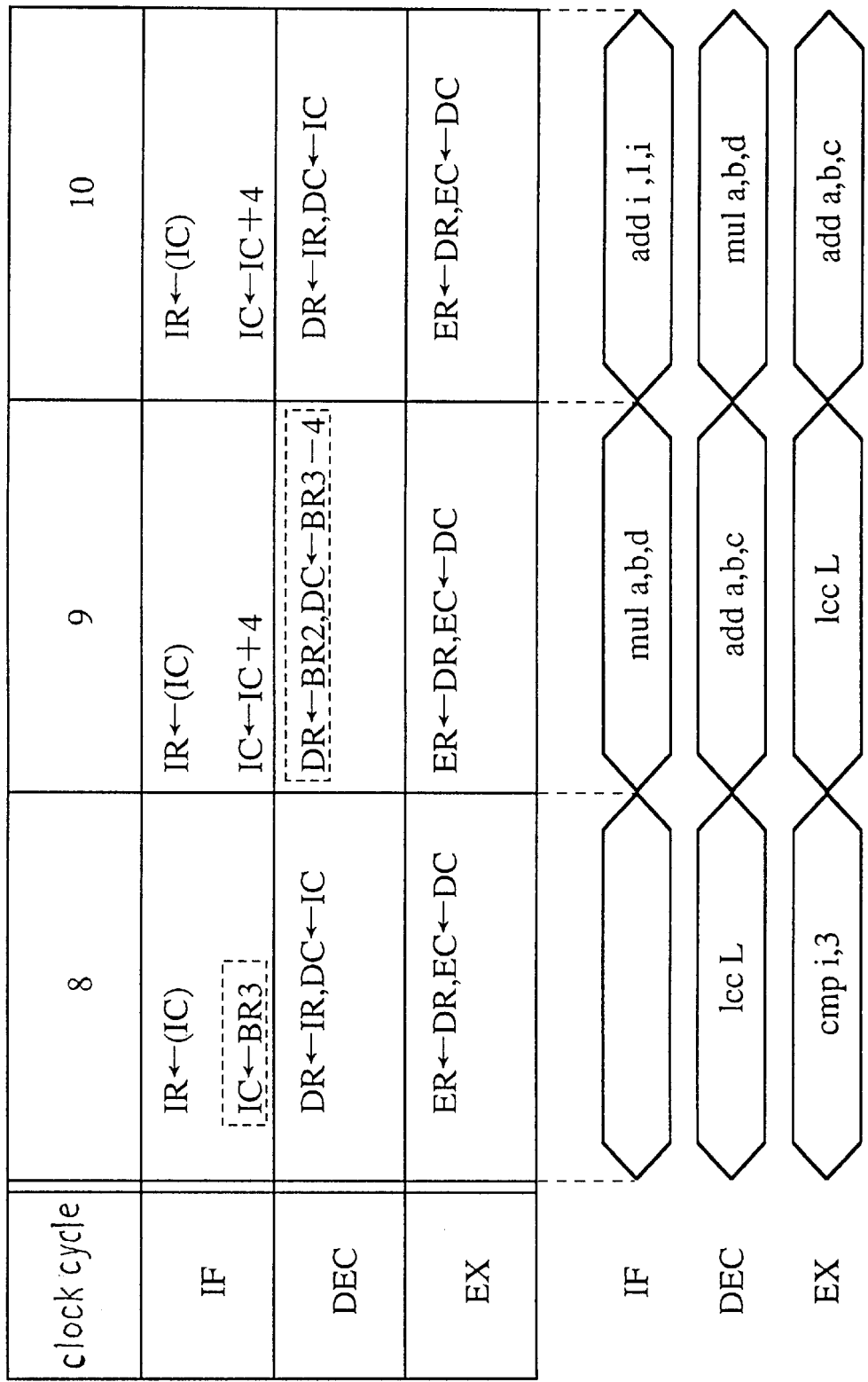
FIG. 14 shows a flow of the pipeline formed when the data processing apparatus executes loop exclusive branching instruction "lcc" in Sixth Embodiment.

FIG. 14 shows an operational flow in the pipeline at an execution of loop exclusive branching instruction "lcc". FIG. 14 corresponds to FIG. 9 in First Embodiment. "BR2" and "BR3" are used to respectively indicate the instruction, "add a,b,c", and the address of the second instruction registered in branch target storage unit 114.

In stage IF at clock cycle 8, an instruction stored in the external memory at an address stored in IC is transferred to IR first, then, the address stored in BR3 is transferred to IC. Then, in stage DEC at clock cycle 9, the instruction, stored in BR2 is transferred from branch target storage unit 114 to DR, the address stored in BR3 is subtracted by 4, then transferred to DC. In the succeeding clock cycles, the program operates the same as First Embodiment.

As apparent from the above description, the present apparatus generates a high-speed loop instruction when compiling a source program, and registers the first address, the first instruction, and the second address of a loop in branch target storage unit 114 during the execution of the first repetition in the loop. After decoding a branch instruction designating a loop, processor 107 does not need to compute branch target address, nor fetch the branch target instruction from a low-speed external memory, and obtains the instruction and address of the second address from branch target storage unit 114.

As a result, the apparatus of Sixth Embodiment has deleted the branch hazard that occurs in the conventional apparatus, increasing the speed of the loop processing.

<Seventh Embodiment>

The data processing apparatus of Seventh Embodiment achieves high-speed loop processing by registering the decoded first address and the decoded first instruction in branch target storage unit 114.
<Construction>

The construction of the data processing apparatus of the present embodiment is the same as that of First Embodiment shown in FIG. 4, except that branch target storage unit 114 stores the decoded first address and the decoded first instruction.
<Operation>

The operation of the present apparatus is the same as that of First Embodiment shown in FIGS. 5 and 6 except that branch target registering instruction "set" and loop exclusive branching instruction "lcc" generate operations different from those of First Embodiment when executed. These points are explained below.

After branch target registering instruction "set" is transferred to decode instruction buffer 109b (DR) and branch target registering unit 111 is activated, the unit 111, at the next clock cycle, reads an address and the decoded instruction "add a,b,c" from decode counter 109a and decode instruction buffer 109b respectively, and registers the read information in branch target storage unit 114.

On the other hand, after loop exclusive branching instruction "lcc" is transferred to decode instruction buffer 109b and branch executing unit 113 is activated, the activated branch executing unit 113 transfers the address of the second instruction specified by instruction "lcc L", being equal to label "L" added by 4, to fetch counter 108a. Then, at the next clock cycle, branch executing unit 113 transfers "0" to decode instruction counter 109a (DC) and decode instruction buffer 109b (DR) to invalidate them, then at the next clock cycle, transfers the decoded address and decoded instruction "add a,b,c" from branch target storage unit 114 to execution instruction counter 110a and execution controlling unit 110b respectively.

Figure 15:
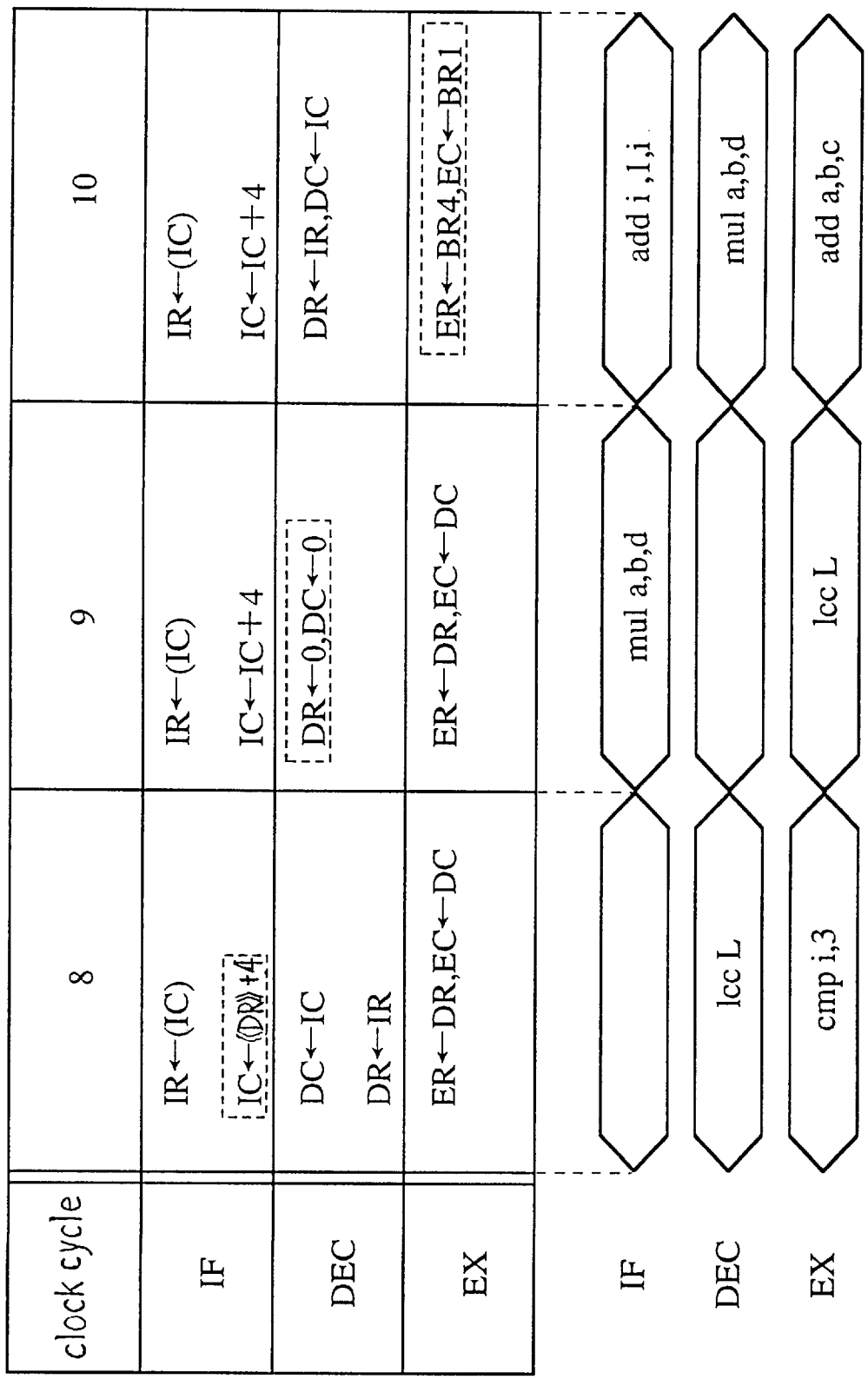
FIG. 15 shows a flow of the pipeline formed when the data processing apparatus executes loop exclusive branching instruction "lcc" in Seventh Embodiment.

FIG. 15 shows an operational flow in the pipeline at an execution of loop exclusive branching instruction "lcc". FIG. 15 corresponds to FIG. 9 in First Embodiment. "BR1" and "BR4" are used to respectively indicate the decoded first address and the decoded first instruction registered in branch target storage unit 114.

In stage IF at clock cycle 8, an instruction stored in the external memory at an address stored in IC is transferred to IR first, then, a part of the instruction stored in DR is transferred to IC. Then, in stage DEC at clock cycle 9, "0" is transferred to DC and DR. In stage EX at clock cycle 10, the decoded instruction stored in BR4 and the address stored in BR1 are transferred from branch target storage unit 114 to ER and EC respectively. In the succeeding clock cycles, the program operates the same as First Embodiment.

As apparent from the above description, the present apparatus generates a high-speed loop instruction when compiling a source program, and registers the decoded first address and the decoded first instruction of a loop in branch target storage unit 114 during the execution of the first repetition in the loop. After decoding a branch instruction designating a loop, processor 107 does not need to compute branch target address and the second address, nor fetch the branch target instruction from a low-speed external memory, and obtains the decoded branch target instruction, the decoded branch target address, and the address of the second instruction from branch target storage unit 114 and loop exclusive branching instruction "lcc L".

As a result, the apparatus of Seventh Embodiment has deleted the branch hazard that occurs in the conventional apparatus, increasing the speed of the loop processing.

<Eighth Embodiment>

The data processing apparatus of Eighth Embodiment achieves high-speed loop processing by registering the first address and the decoded first instruction in branch target storage unit 114.
<Construction>

The construction of the data processing apparatus of the present embodiment is the same as that of First Embodiment shown in FIG. 4, except that branch target storage unit 114 stores the first address and the decoded first instruction.
<Operation>

The operation of the present apparatus is the same as that of First Embodiment shown in FIGS. 5 and 6 except that branch target registering instruction "set" and loop exclusive branching instruction "lcc" generate operations different from those of First Embodiment when executed. These points are explained below.

After branch target registering instruction "set" is transferred to decode instruction buffer 109b (DR) and branch target registering unit 111 is activated, the unit 111, at the next clock cycle, reads the first address and the decoded first instruction from decode counter 109a and decode instruction buffer. 109b, and registers the read information in branch target storage unit 114.

On the other hand, after loop exclusive branching instruction "lcc" is transferred to decode instruction buffer 109b and branch executing unit 113 is activated, the activated branch executing unit 113 adds 4 to the address registered in unit 114 and transfers the result to fetch counter 108a. Then, at the next clock cycle, branch executing unit 113 transfers "0" to decode counter 109a (DC) and decode instruction buffer 109b (DR) to invalidate them, then at the next clock cycle, transfers the first address and the decoded first instruction from branch target storage unit 114 to execution instruction counter 110a and execution controlling unit 110b respectively.

Figure 16:
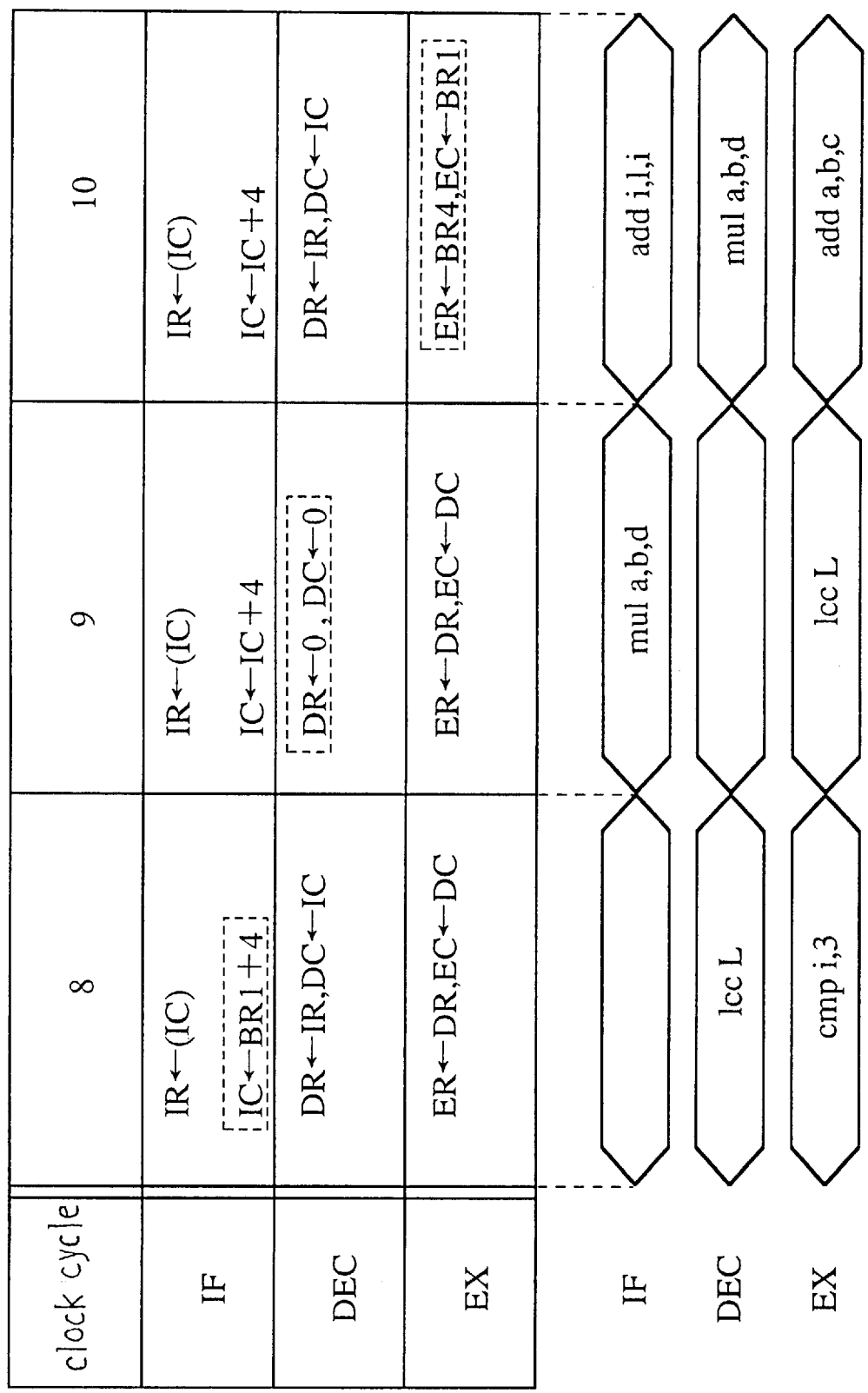
FIG. 16 shows a flow of the pipeline formed when the data processing apparatus executes loop exclusive branching instruction "lcc" in Eighth Embodiment.

FIG. 16 shows an operational flow in the pipeline at an execution of loop exclusive branching instruction "lcc". FIG. 16 corresponds to FIG. 9 in First Embodiment. "BR1" and "BR4" are used to respectively indicate the first address and the decoded first instruction registered in branch target storage unit 114.

In stage IF at clock cycle 8, an instruction stored in the external memory at an address stored in IC is transferred to IR first, then, 4 is added to the address read from branch target storage unit 114 and the result is transferred to IC. Then, in stage DEC at clock cycle 9, "0" is transferred to DC and DR. In stage EX at clock cycle 10, the decoded instruction stored in BR4 and the decoded address stored in BR1 are transferred from branch target storage unit 114 to ER and EC respectively. In the succeeding clock cycles, the program operates the same as First Embodiment.

As apparent from the above description, the present apparatus generates a high-speed loop instruction when compiling a source program, and registers the decoded first instruction and the second address of a loop in branch target storage unit 114 during the execution of the first repetition in the loop. After decoding a branch instruction designating a loop, processor 107 does not need to compute branch target address and the second address, nor fetch the branch target instruction from a low-speed external memory, and obtains the decoded first instruction and the second address from branch target storage unit 114.

As a result, the apparatus of Eighth Embodiment has deleted the branch hazard that occurs in the conventional apparatus, increasing the speed of the loop processing.

<Ninth Embodiment>

The data processing apparatus of Ninth Embodiment achieves high-speed loop processing by registering the decoded first address, the decoded first instruction, and the address of the second instruction in branch target storage unit 114.

<Construction>

The construction of the data processing apparatus of the present embodiment is the same as that of First Embodiment shown in FIG. 4, except that branch target storage unit 114 stores the first address, the decoded first instruction, and the address of the second instruction of a loop.

<Operation>

The operation of the present apparatus is the same as that of First Embodiment shown in FIGS. 5 and 6 except that branch target registering instruction "set" and loop exclusive branching instruction "lcc" generate operations different from, those of First Embodiment when executed. These points are explained below.

After branch target registering instruction "set" is transferred to decode instruction buffer 109b (DR) and branch target registering unit 111 is activated, the unit 111, at the next clock cycle, reads the decoded first address and the decoded first instruction, and registers the information and a value of the address added by 4 in branch target storage unit 114.

On the other hand, after loop exclusive branching instruction "lcc" is transferred to decode instruction buffer 109b and branch executing unit 113 is activated, the activated branch executing unit 113 transfers the value registered in unit 114 to fetch counter 108a. Then, at the next clock cycle, branch executing unit 113 transfers "0" to decode counter 109a (DC) and decode instruction buffer 109b (DR) to invalidate them, then at the next clock cycle, transfers the first address and the decoded first instruction "add a,b,c" from branch target storage unit 114 to execution instruction counter 110a and execution controlling unit 110b respectively.

Figure 17:
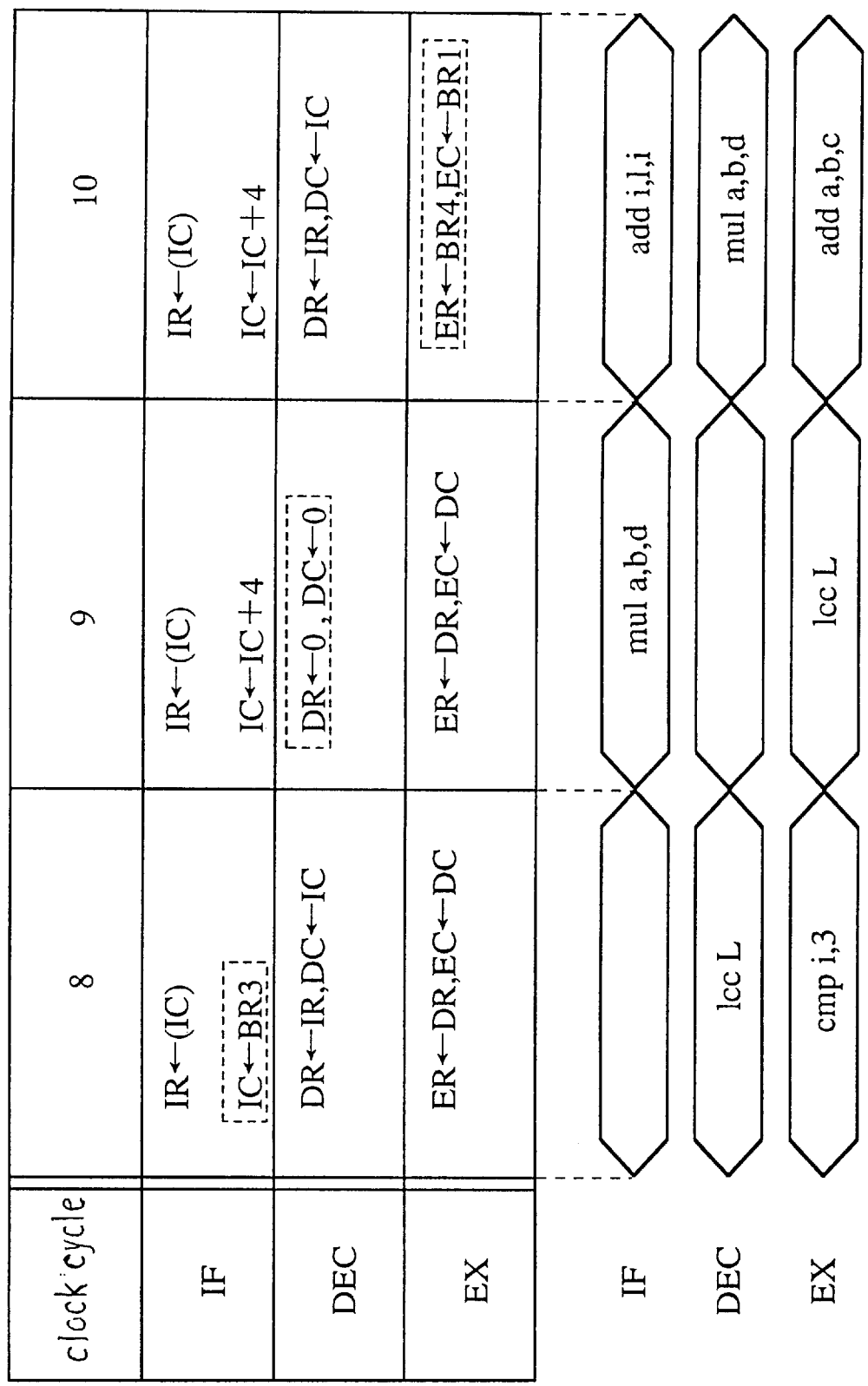
FIG. 17 shows a flow of the pipeline formed when the data processing apparatus executes loop exclusive branching instruction "lcc" in Ninth Embodiment.

FIG. 17 shows an operational flow in the pipeline at an execution of loop exclusive branching instruction "lcc". FIG. 17 corresponds to FIG. 9 in First Embodiment. "BR1", "BR3", and "BR4" are used to respectively indicate the first address, the address of the second instruction, and the decoded first instruction registered in branch target storage unit 114.

In stage IF at clock cycle 8, an instruction stored in the external memory at an address stored in IC is transferred to IR first, then, the address stored in BR3 is transferred to IC. Then, in stage DEC at clock cycle 9, "0" is transferred to DC and DR. In stage EX at clock cycle 10, the decoded first instruction stored in BR4 and the first address stored in BR1 are transferred from branch target storage unit 114 to ER and EC respectively. In the succeeding clock cycles, the program operates the same as First Embodiment.

As apparent from the above description, the present apparatus generates a high-speed loop instruction when compiling a source program, and registers the first micro instruction, the first address, and the second address of a loop in branch target storage unit 114 during the execution of the first repetition in the loop. After decoding a branch instruction designating a loop, processor 107 does not need to compute branch target address and the second address, nor fetch the branch target instruction from a low-speed external memory, and obtains the decoded branch target instruction, the decoded branch target address, and the address of the second instruction from branch target storage unit 114.

As a result, the apparatus of Ninth Embodiment has deleted the branch hazard that occurs in the conventional apparatus, increasing the speed of the loop processing.

<Tenth Embodiment>

The data processing apparatus of Tenth Embodiment achieves high-speed loop processing by registering the decoded first instruction and the address of the second instruction in branch target storage unit 114 and by using a loop exclusive branching instruction for specifying the first address.

<Construction>

The construction of the data processing apparatus of the present embodiment is the same as that of First Embodiment shown in FIG. 4, except that branch target storage unit 114 stores the decoded first instruction and the address of the second instruction of a loop.

<Operation>

The operation of the present apparatus is the same as that of First Embodiment shown in FIGS. 5 and 6 except that branch target registering instruction "set" and loop exclusive branching instruction "lcc" generate operations different from those of First Embodiment when executed. These points are explained below.

After branch target registering instruction "set" is transferred to decode instruction buffer 109b (DR) and branch target registering unit 111 is activated, the unit 111, at the next clock cycle, reads the first address and the decoded first instruction, and registers a value of the first address added by 4 and the decoded instruction "add a,b,c" in branch target storage unit 114.

On the other hand, after loop exclusive branching instruction "lcc" is transferred to decode instruction buffer 109b and branch executing unit 113 is activated, the activated branch executing unit 113 transfers the address of the second instruction registered in unit 114 to fetch counter 108a. Then, at the next clock cycle, branch executing unit 113 transfers "0" to decode counter 109a (DC) and decode instruction buffer 109b (DR) to invalidate them, then at the next clock cycle, transfers an address specified by instruction "lcc", namely the value for "L", from execution controlling unit 110b to execution instruction counter 110a, then transfers the decoded instruction "add a,b,c" registered in unit 114 to execution controlling unit 110b.

Figure 18:
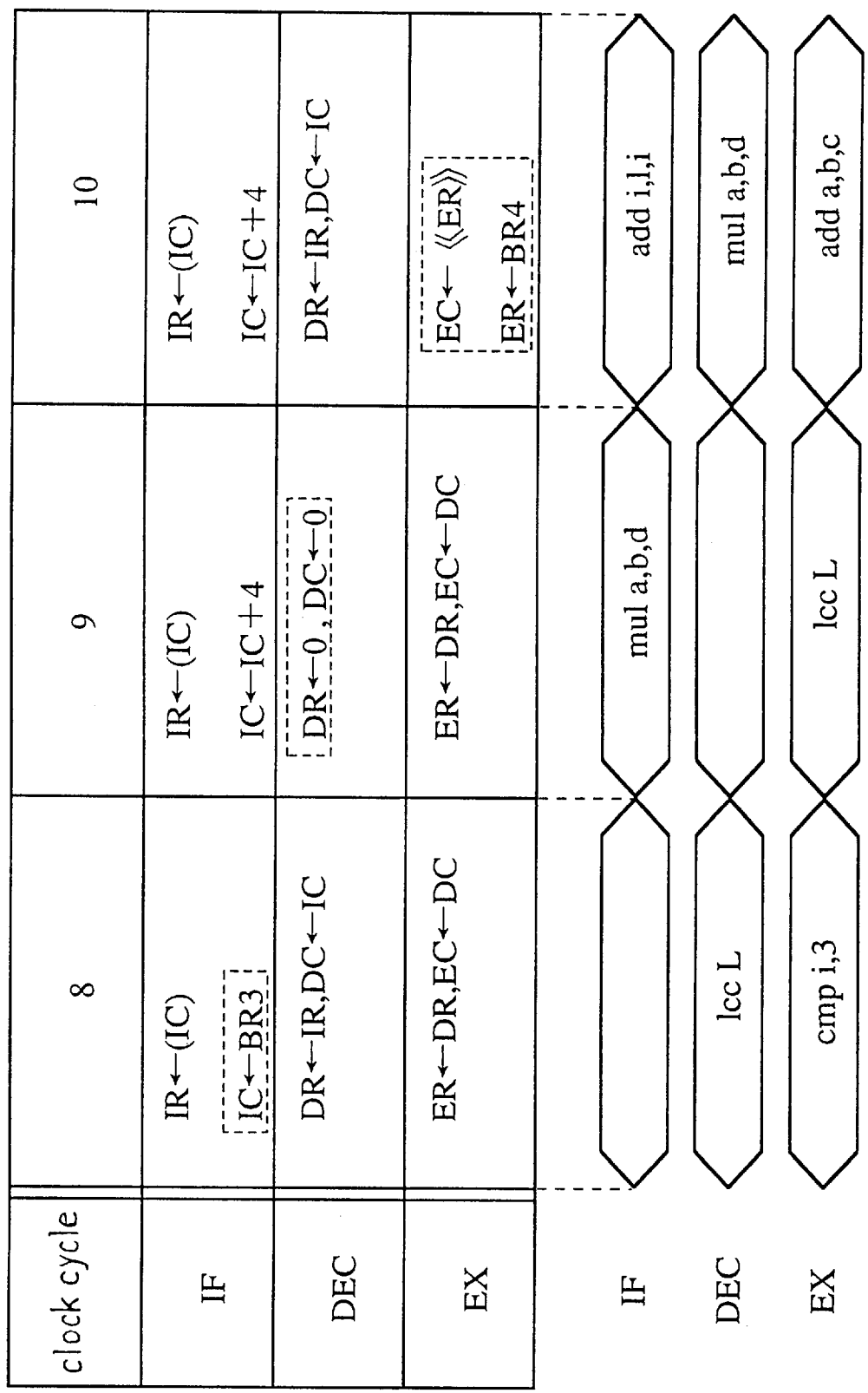
FIG. 18 shows a flow of the pipeline formed when the data processing apparatus executes loop exclusive branching instruction "lcc" in Tenth Embodiment.

FIG. 18 shows an operational flow in the pipeline at an execution of loop exclusive branching instruction "lcc". FIG. 18 corresponds to FIG. 9 in First Embodiment. "BR3" and "BR4" are used to respectively indicate the address of the second instruction and the decoded first instruction registered in branch target storage unit 114.

In stage IF at clock cycle 8, an instruction stored in the external memory at an address stored in IC is transferred to IR first, then, the address stored in BR3 is transferred to IC. Then, in stage DEC at clock cycle 9, "0" is transferred to DC and DR. In stage EX at clock cycle 10, a part of an instruction stored in ER is transferred to EC first, then, the decoded first instruction is transferred from branch target storage unit 114 to ER. In the succeeding clock cycles, the program operates the same as First Embodiment.

As apparent from the above description, the present apparatus generates a high-speed loop instruction when compiling a source program, and registers the decoded first instruction and the second address of a loop in branch target storage unit 114 during the execution of the first repetition in the loop. After decoding a branch instruction designating a loop, processor 107 does not need to compute branch target address and the second address, nor fetch the branch target instruction from a low-speed external memory, and obtains the decoded branch target instruction, the address of the second instruction, and branch target address from branch target storage unit 114 and loop exclusive instruction "lcc L".

As a result, the apparatus of Tenth Embodiment has deleted the branch hazard that occurs in the conventional apparatus, increasing the speed of the loop processing.

<Eleventh Embodiment>

The data processing apparatus of Eleventh Embodiment achieves high-speed loop processing by registering the decoded first instruction, and the address of the second instruction in branch target storage unit 114 and by computing the branch target address.

<Construction>

The construction of the data processing apparatus of the present embodiment is the same as that of First Embodiment shown in FIG. 4, except that branch target storage unit 114 stores the decoded first instruction and the address of the second instruction of a loop.

<Operation>

The operation of the present apparatus is the same as that of First Embodiment shown in FIGS. 5 and 6 except that branch target registering instruction "set" and loop exclusive branching instruction "lcc" generate operations different from those of First Embodiment when executed. These points are explained below.

After branch target registering instruction "set" is transferred to decode instruction buffer 109b (DR) and branch target registering unit 111 is activated, the unit 111, at the next clock cycle, reads the first address and the decoded first instruction, and adds 4 to the address and registers the result value and the decoded instruction in branch target storage unit 114.

On the other hand, after loop exclusive branching instruction "lcc" is transferred to decode instruction buffer 109b and branch executing unit 113 is activated, the activated branch executing unit 113 transfers the result value registered in unit 114 to fetch counter 108a. Then, at the next clock cycle, branch executing unit 113 transfers "0" to decode instruction counter 109a (DC) and decode instruction buffer 109b (DR) to invalidate them, then at the next clock cycle, reads the address and the decoded instruction "add a,b,c" from branch target storage unit 114, and transfers a value of the address subtracted by 4 and the decoded instruction to execution instruction counter 110a and execution controlling unit 110b respectively.

Figure 19:
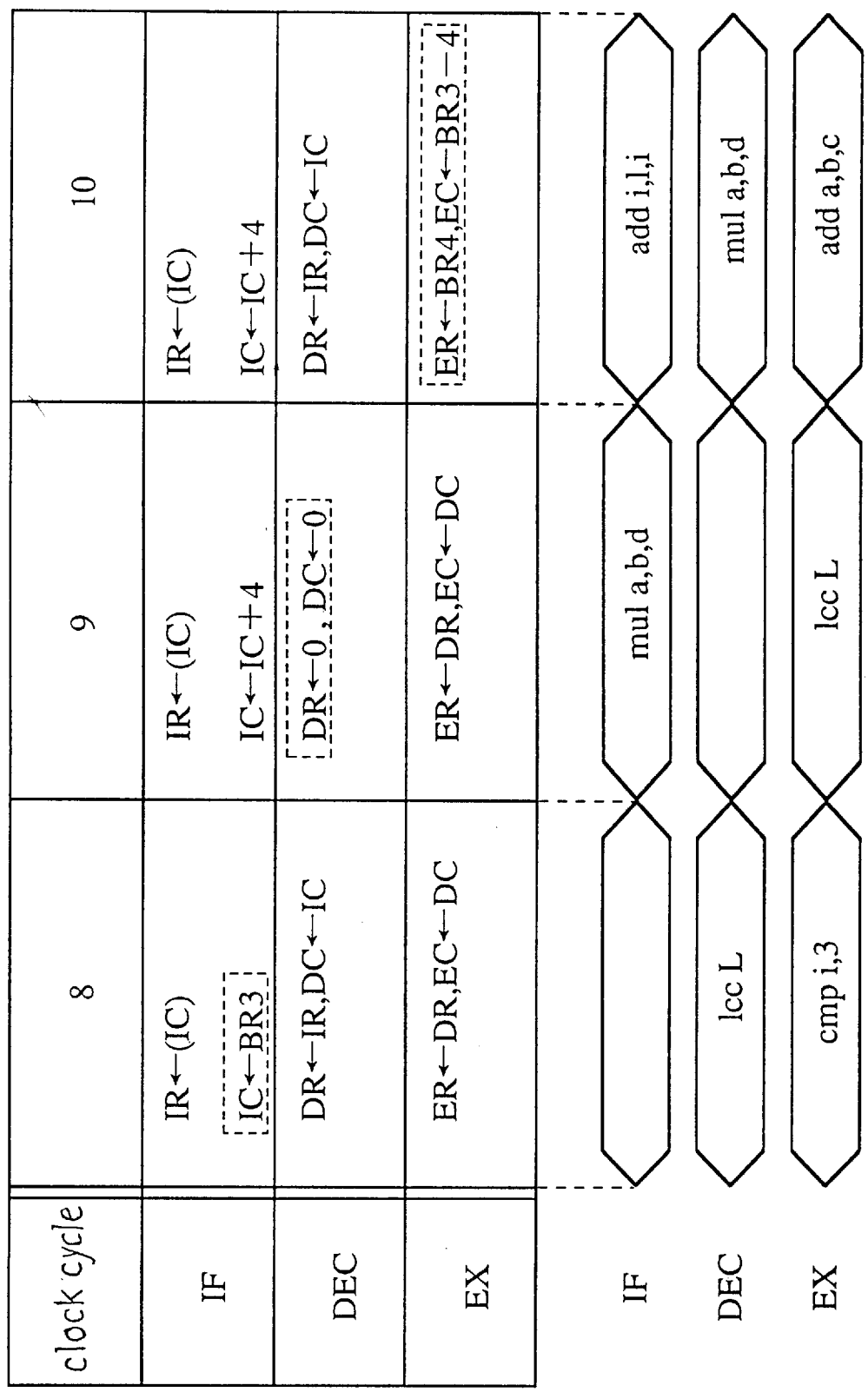
FIG. 19 shows a flow of the pipeline formed when the data processing apparatus executes loop exclusive branching instruction "lcc" in Eleventh Embodiment.

FIG. 19 shows an operational flow in the pipeline at an execution of loop exclusive branching instruction "lcc". FIG. 19 corresponds to FIG. 9 in First Embodiment. "BR3" and "BR4" are used to respectively indicate the address of the second instruction and the decoded first instruction registered in branch target storage unit 114.

In stage IF at clock cycle 8, an instruction stored in the external memory at an address stored in IC is transferred to IR first. Then, in stage DEC at clock cycle 9, "0" is transferred to DC and DR. In stage EX at clock cycle 10, the decoded instruction stored in BR4 is transferred to ER, and the address stored in BR3 is subtracted by 4 then transferred to EC. In the succeeding clock cycles, the program operates the same as First Embodiment.

As apparent from the above description, the present apparatus generates a high-speed loop instruction when compiling a source program, and registers the decoded first instruction and the second address of a loop in branch target storage unit 114 during the execution of the first repetition in the loop. After decoding a branch instruction designating a loop, processor 107 does not need to compute the second address, nor fetch the branch target instruction from a low-speed external memory, and obtains the decoded branch target instruction and the address of the second instruction from branch target storage unit 114.

As a result, the apparatus of Eleventh Embodiment has deleted the branch hazard that occurs in the conventional apparatus, increasing the speed of the loop processing.

The present invention has more variations other than these embodiments. For example,:

(1) Compiler 102 in the above embodiments is described to output any one of high-speed loop instructions, "set", "clr", and "lcc". However, the compiler may output two kinds of high-speed loop instructions such as "set1" and "set2", "clr1" and "clcr2", and "lcc1" and "lcc2", instead of each of the above instructions. These instructions may be related to locations of branch target information stored in branch target storage unit 114. This reduces time for accessing branch target storage unit 114.

(2) Branch target storage unit 114 in the above embodiments comprises LIFO latches. However, the unit may comprise another type of latches, such as "ring". The ring latches enable the unit to input or output branch target information with flexibility and at high speed.

Also, branch target storage unit 114, having a capacity of up to two pairs of pieces of branch target information in the above embodiments, may have a capacity of a pair of pieces of information. In such case, branch target registering unit 111 keeps overwriting information in branch target storage unit 114, and branch target clearing unit 112 is not required anymore.

Also, when branch target storage unit 114 stores an instruction sequence, the total size of the instructions to be stored, not the total number of instructions to be stored, may be fixed. With such arrangement, the capacity of the unit will be used effectively even for variable-length instructions.

(3) Loop detecting unit 103 in the above embodiments detects up to two nested loops from innermost when one or more loops are nested in a loop. However, in such case, the unit may detect loops that are executed most frequently.

(4) Instruction fetching unit 108, which stores an instruction in the above embodiments, may store more instructions with First In First Out (FIFO) format.

(5) Processor 107 in the above embodiments executes high-speed loop instructions "set" and "clr" on one-by-one basis. However, the processor may execute these instructions on parallel with other near instructions. These instructions can be executed independently because they only access branch target storage unit 114 and do not depend on other instructions.

In the above embodiments, branch target registering unit 111, branch target clearing unit 112, and branch executing unit 113 are respectively activated by instructions "set", "clr", and "lcc". However, other instructions may include such functions so that high-speed loop instructions are executed on parallel with other instructions. (6) In First and Eighth Embodiments, branch executing unit 113 may use an exclusive incrementing device in the unit not shown in FIG. 4 when adding 4 to the address stored in branch target storage unit 114.

In Third, Fifth, Seventh, and Tenth Embodiments, branch executing unit 113 may use an exclusive arithmetic unit in the unit not shown in FIG. 4 when computing an address that is equal to label "L".

In Sixth and Eleventh Embodiments, branch executing unit 113 may use an exclusive decrementing device in the unit not shown in FIG. 4 when subtracting 4 from the address stored in branch target storage unit 114.

By allowing branch executing unit 113 to use these exclusive units, the processor will achieve high-speed performances.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A compiler for compiling a source program and generating a program containing a machine-language instruction sequence for a processor, comprising:
   a loop detecting means for detecting certain loops from the source program and extracting information of the detected loops from the source program, the extracted information being used to specify the certain loops; and
   a high-speed loop applying means, comprising:
      a first loop exclusive instruction generating unit for generating a first loop exclusive instruction which indicates a succeeding instruction is an entry of a loop and placing the first loop exclusive instruction immediately before the entry of the loop in the machine-language instruction sequence; and
      a second loop exclusive instruction generating unit for generating second loop exclusive instructions which direct the program to branch to the entry of the loop and placing the second loop exclusive instructions at places from where the program branches to the entry of the loop, the first loop exclusive instruction generating unit and the second loop exclusive instruction generating unit operating based on the information extracted by the loop detecting means, wherein the first loop exclusive instruction includes a first code which explicitly instructs the processor to register branch target information in a dedicated branch target storage means of the processor prior to execution of the program, and
      wherein each of the second loop exclusive instructions includes a second code which explicitly instructs the processor to judge whether to execute a loop without first determining whether a branch target address is registered in the dedicated branch target storage means, instructs the processor to read the branch target information registered in the dedicated branch target storage means when the processor judges to execute, and instructs the processor to execute the loop using the branch target information.

2. The compiler as defined in claim 1 wherein the high-speed loop applying means further comprises:
   a third loop exclusive instruction generating unit for generating a third loop exclusive instruction which indicates that the loop has ended, and placing the third loop exclusive instruction immediately after an exit of the loop in the machine-language instruction sequence, based on the information extracted by the loop detecting means, wherein the third loop exclusive instruction includes a third code which explicitly instructs the processor to clear the branch target information registered in the dedicated branch target storage means of the processor.

3. A processor for executing a program containing a machine-language instruction sequence which includes certain instructions, namely a first loop exclusive instruction and a second loop exclusive instruction, comprising:
   a pipeline, comprising:
      a fetching unit for fetching instructions one by one from the machine-language instruction sequence;
      a decoding unit for decoding the instructions fetched by the fetching unit; and
      an executing unit for executing the instructions decoded by the decoding unit;
   a branch target storage means;
   a registering means for, after the decoding unit has decoded a first loop exclusive instruction, registering branch target information in the branch target storage means, wherein the first loop exclusive instruction includes a first code which explicitly instructs the processor to register the branch target information in the branch target storage means prior to execution of the program; and
   a branch executing means for, after the decoding unit has decoded a second loop exclusive instruction, judging whether to execute a loop, if judges to execute, reading the branch target information registered in the branch target storage means, and controlling the pipeline so that the program executes the loop using the read branch target information, wherein each of the second loop exclusive instructions includes a second code which explicitly instructs the processor to judge whether to execute a loop without first determining whether a branch target address is registered in the dedicated branch target storage means, instructs the processor to read the branch target information registered in the branch target storage means when the processor judges to execute, and instructs the processor to control the pipeline so that the program executes the loop using the branch target information.

4. A processor for executing a program containing a machine-language instruction sequence which includes certain instructions, namely a first loop exclusive instruction and a second loop exclusive instruction, comprising:

a pipeline, comprising:
  a fetching unit for fetching instructions one by one from the machine-language instruction sequence;
  a decoding unit for decoding the instructions fetched by the fetching unit; and
  an executing unit for executing the instructions decoded by the decoding unit;
a branch target storage means;
a registering means for, after the decoding unit has decoded a first loop exclusive instruction, registering branch target information in the branch target storage means, wherein the first loop exclusive instruction includes a first code which explicitly instructs the processor to register the branch target information in the branch target storage means prior to execution of the program;
a branch executing means for, after the decoding unit has decoded a second loop exclusive instruction, judging whether to execute a loop, if judges to execute, reading the branch target information registered in the branch target storage means, and controlling the pipeline so that the program executes the loop using the read branch target information, wherein each of the second loop exclusive instructions includes a second code which explicitly instructs the processor to judge whether to execute a loop without first determining whether a branch target address is registered in the dedicated branch target storage means, instructs the processor to read the branch target information registered in the branch target storage means when the processor judges to execute, and instructs the processor to control the pipeline so that the program executes the loop using the branch target information; and
a clearing means for, after the decoding unit has decoded a third loop exclusive instruction, clearing the branch target information registered in the branch target storage means, wherein the third loop exclusive instruction includes a third code which explicitly instructs the processor to clear the branch target information registered in the branch target storage means.

5. The processor as defined in claim 4, wherein
the registering means, after the decoding unit has decoded a first loop exclusive instruction, registers an address of an instruction succeeding to the first loop exclusive instruction in the branch target storage means, and wherein
the branch executing means, if having judged to execute a loop, reads the address registered in the branch target storage means, and controls the pipeline so that the fetching unit fetches instructions starting from the instruction at the address.

6. The processor as defined in claim 4, wherein
the registering means, after the decoding unit has decoded a first loop exclusive instruction, registers an address of an instruction succeeding to the decoded first loop exclusive instruction and a certain number of instructions succeeding to the first loop exclusive instruction in the branch target storage means, and wherein
the branch executing means, if having judged to execute a loop, reads the address and the certain number of instructions registered in the branch target storage means, and controls the pipeline so that the decoding unit decodes the certain number of instructions starting from the instruction at the read address and the fetching unit fetches instructions starting from an instruction at an address which is obtained by performing a certain computation on an address specified by the second loop exclusive instruction.

7. The processor as defined in claim 4, wherein
the registering means, after the decoding unit has decoded a first loop exclusive instruction, registers an address of an instruction succeeding to the first loop exclusive instruction and a certain number of instructions succeeding to the first loop exclusive instruction in the branch target storage means, and wherein
the branch executing means, if having judged to execute a loop, reads the address and the certain number of instructions registered in the branch target storage means, and controls the pipeline so that the decoding unit decodes the certain number of instructions starting from the instruction at the read address and the fetching unit fetches instructions starting from an instruction at an address which is obtained by performing a certain computation on the read address.

8. The processor as defined in claim 4, wherein
the registering means, after the decoding unit has decoded a first loop exclusive instruction, registers a first address of an instruction succeeding to the first loop exclusive instruction, a certain number of instructions succeeding to the first loop exclusive instruction, and a second address of an instruction to be executed immediately after the certain number of instructions in the branch target storage means, and wherein
the branch executing means, if having judged to execute a loop, reads the first address, the certain number of instructions, and the second address registered in the branch target storage means, and controls the pipeline so that the decoding unit decodes the certain number of instructions starting from the instruction at the first address and the fetching unit fetches instructions starting from the instruction at the second address.

9. The processor as defined in claim 4, wherein
the registering means, after the decoding unit has decoded a first loop exclusive instruction, registers a certain number of instructions succeeding to the first loop exclusive instruction and an address of an instruction to be executed immediately after the certain number of instructions in the branch target storage means, and wherein
the branch executing means, if having judged to execute a loop, reads the certain number of instructions and the address registered in the branch target storage means, and controls the pipeline so that the decoding unit decodes the certain number of instructions starting from an instruction at an address specified by the second loop exclusive instruction and the fetching unit fetches instructions starting from an instruction at the address registered in the branch target storage means.

10. The processor as defined in claim 4, wherein
the registering means, after the decoding unit has decoded a first loop exclusive instruction, registers a certain number of instructions succeeding to the first loop exclusive instruction and an address of an instruction to be executed immediately after the certain number of instructions in the branch target storage means, and wherein
the branch executing means, if having judged to execute a loop, reads the certain number of instructions and the address registered in the branch target storage means, and controls the pipeline so that the decoding unit decodes the certain number of instructions starting from an instruction at an address which is obtained by performing a certain computation on the read address and the fetching unit fetches instructions starting from an instruction at the read address.

11. The processor as defined in claim 4, wherein the registering means, after the decoding unit has decoded a first loop exclusive instruction, registers an address of an instruction succeeding to the first loop exclusive instruction and a decoded certain number of instructions succeeding to the first loop exclusive instruction in the branch target storage means, and wherein the branch executing means, if having judged to execute a loop, reads the address and the decoded certain number of instructions registered in the branch target storage means, and controls the pipeline so that the executing unit executes the decoded certain number of instructions starting from an instruction at the read address and the fetching unit fetches instructions starting from an instruction at an address obtained by performing a certain computation on an address specified by the second loop exclusive instruction.

12. The processor as defined in claim 4, wherein the registering means, after the decoding unit has decoded a first loop exclusive instruction, registers an address of an instruction succeeding to the first loop exclusive instruction and a decoded certain number of instructions succeeding to the first loop exclusive instruction in the branch target storage means, and wherein the branch executing means, if having judged to execute a loop, reads the address and the decoded certain number of instructions registered in the branch target storage means, and controls the pipeline so that the executing unit executes the decoded certain number of instructions starting from an instruction at the read address and the fetching unit fetches instructions starting from an instruction at an address obtained by performing a certain computation on the read address.

13. The processor as defined in claim 4, wherein the registering means, after the decoding unit has decoded a first loop exclusive instruction, registers a first address of an instruction succeeding to the first loop exclusive instruction, a decoded certain number of instructions succeeding to the first loop exclusive instruction, and a second address of an instruction to be executed immediately after the decoded certain number of instructions in the branch target storage means, and wherein the branch executing means, if having judged to execute a loop, reads the first address, the decoded certain number of instructions, and the second address registered in the branch target storage means, and controls the pipeline so that the executing unit executes the decoded certain number of instructions starting from the instruction at the first address and the fetching unit fetches instructions starting from the instruction at the second address.

14. The processor as defined in claim 4, wherein the registering means, after the decoding unit has decoded a first loop exclusive instruction, registers a decoded certain number of instructions succeeding to the first loop exclusive instruction and an address of an instruction to be executed immediately after the decoded certain number of instructions in the branch target storage means, and wherein the branch executing means, if having judged to execute a loop, reads the decoded certain number of instructions and the address registered in the branch target storage means, and controls the pipeline so that the executing unit executes the decoded certain number of instructions starting from an instruction at an address specified by the second loop exclusive instruction and the fetching unit fetches instructions starting from an instruction at the address registered in the branch target storage means.

15. The processor as defined in claim 4, wherein the registering means, after the decoding unit has decoded a first loop exclusive instruction, registers a decoded certain number of instructions succeeding to the first loop exclusive instruction and an address of an instruction to be executed immediately after the decoded certain number of instructions in the branch target storage means, and wherein the branch executing means, if having judged to execute a loop, reads the decoded certain number of instructions and the address registered in the branch target storage means, and controls the pipeline so that the executing unit executes the decoded certain number of instructions starting from the read address and the fetching unit fetches instructions starting from an instruction at an address which is obtained by performing a certain computation on the read address.

16. A compiler for compiling a source program and generating a program containing a machine-language instruction sequence for a processor, comprising:

a loop detecting means for detecting certain loops from the source program and extracting information of the detected loops from the source program, the extracted information being used to specify the certain loops; and a high-speed loop applying means, comprising;

a first loop exclusive instruction generating unit for generating a first loop exclusive instruction which indicates a succeeding instruction is an entry of a loop and placing the first loop exclusive instruction immediately before the entry of the loop in the machine-language instruction sequence; wherein the first loop exclusive instruction includes a first code which explicitly instructs the processor to register branch target information in a dedicated branch target storage means of the processor prior to execution of the program and independent from the contents of the certain loops; and a second loop exclusive instruction generating unit for generating second loop exclusive instructions which direct the program to branch to the entry of the loop and placing the second loop exclusive instructions at places from where the program branches to the entry of the loop, the first loop exclusive instruction generating unit and the second loop exclusive instruction generating unit operating based on the information extracted by the loop detecting means, wherein each of the second loop exclusive instructions includes a second code which explicitly instructs the processor to determine whether to execute a loop without first determining whether a branch target address is registered in the dedicated branch target storage means and only reads the branch target information registered in the dedicated branch storage means when the processor determines to execute a loop; the second code further instructing the processor to execute the loop using the branch target information.

* * * * *